(12) United States Patent
Belicofski

(10) Patent No.: US 9,298,161 B2
(45) Date of Patent: Mar. 29, 2016

(54) ARRAYED COHERENT WAVEFRONT EXPANSION DEVICE FOR PULSED REFLECTION HOLOGRAPHY

(76) Inventor: Jeffrey Max Belicofski, Sydney (AU)

( * ) Notice: Subject to any disclaimer, the term of this patent is extended or adjusted under 35 U.S.C. 154(b) by 0 days.

(21) Appl. No.: 13/199,839

(22) Filed: Sep. 12, 2011

(65) Prior Publication Data
US 2013/0063796 A1    Mar. 14, 2013

(51) Int. Cl.
| | | |
|---|---|---|
| G03H 1/26 | (2006.01) | |
| G03H 1/04 | (2006.01) | |
| G03H 1/02 | (2006.01) | |
| G02B 6/02 | (2006.01) | |

(52) U.S. Cl.
CPC .............. *G03H 1/0402* (2013.01); *G03H 1/265* (2013.01); *G02B 6/02328* (2013.01); *G03H 1/0248* (2013.01); *G03H 2001/0415* (2013.01); *G03H 2001/0426* (2013.01); *G03H 2001/0436* (2013.01); *G03H 2001/2655* (2013.01); *G03H 2222/20* (2013.01); *G03H 2222/33* (2013.01); *G03H 2222/42* (2013.01); *G03H 2222/44* (2013.01); *G03H 2222/50* (2013.01); *G03H 2222/52* (2013.01); *G03H 2223/16* (2013.01); *G03H 2227/02* (2013.01)

(58) Field of Classification Search
CPC .... G02B 5/32; G02B 27/0025; G02B 5/1857; G02B 19/0028; G02B 19/0057; G02B 23/14; G02B 27/0944; G02B 27/1086; G02B 27/16; G02B 27/60; G02B 5/02; G02B 6/0035; G02B 6/02085; G02B 21/32; G02B 26/106; G02B 27/2285; G02B 27/42
USPC .......................... 359/1, 28, 30, 34, 35, 22, 24
See application file for complete search history.

(56) References Cited

U.S. PATENT DOCUMENTS

| | | | |
|---|---|---|---|
| 3,970,357 A | 7/1976 | Moraw et al. | |
| 5,120,621 A | 6/1992 | Ramsbottom | |
| 5,650,758 A * | 7/1997 | Xu ........................ | H03F 1/3247 330/149 |
| 5,696,613 A | 12/1997 | Redfield et al. | |
| 6,862,121 B2 | 3/2005 | Psaltis et al. | |
| 7,339,711 B2 | 3/2008 | Kuroda et al. | |

(Continued)

OTHER PUBLICATIONS

Ultimate Low loss of Hollow-Core Photonic crystal fibers—Optics Express vol. 13 ; No. 1; Jan. 2005 pp. 236-244.

(Continued)

*Primary Examiner* — Thomas K Pham
*Assistant Examiner* — Sharrief Broome

(57) ABSTRACT

An apparatus for the recording and multiplexing of pulsed reflection holograms made possible with the invention of the Hollow Core Photonic Crystal Fiber is disclosed herein. This holographic imaging apparatus uses the Hollow Core Photonic Crystal Fiber as a waveguide in which the highly coherent property of the lightwave required for recording interference fringes can propagate through this waveguide without this coherency of the lightwave diminishing. This apparatus enables the multiplexing of several reflection holograms in a single recording medium using the reference beam with several object beams in sequenced intervals of time and space; several multiplexed recordings are made within a brief interval in time with the object beam emanating from incremental points in space; around a 120 degree tangential arc in space to achieve parallax around this 120 degree tangential arc. This disclosure makes possible apparatus which is transportable and shoulder mountable for pulsed reflection holography.

4 Claims, 16 Drawing Sheets

(56) References Cited

U.S. PATENT DOCUMENTS

| | | |
|---|---|---|
| 7,362,482 B2 | 4/2008 | Kihara |
| 7,710,845 B2 | 5/2010 | Matsumura |
| 2007/0159701 A1* | 7/2007 | Campbell ............ G02B 5/3083 359/676 |
| 2007/0297072 A1* | 12/2007 | Omura .......................... 359/730 |
| 2008/0192313 A1* | 8/2008 | Matsumura .............. G03H 1/18 359/22 |
| 2009/0034071 A1* | 2/2009 | Jennings ............ B23K 26/0604 359/489.08 |

OTHER PUBLICATIONS

Visualizing the Photonic Band Gap in Hollow Core Photonic crystal fibers—Optics 'Express vol. 13 No. 2 Jan. 2005 pp. 558 to 563.

* cited by examiner

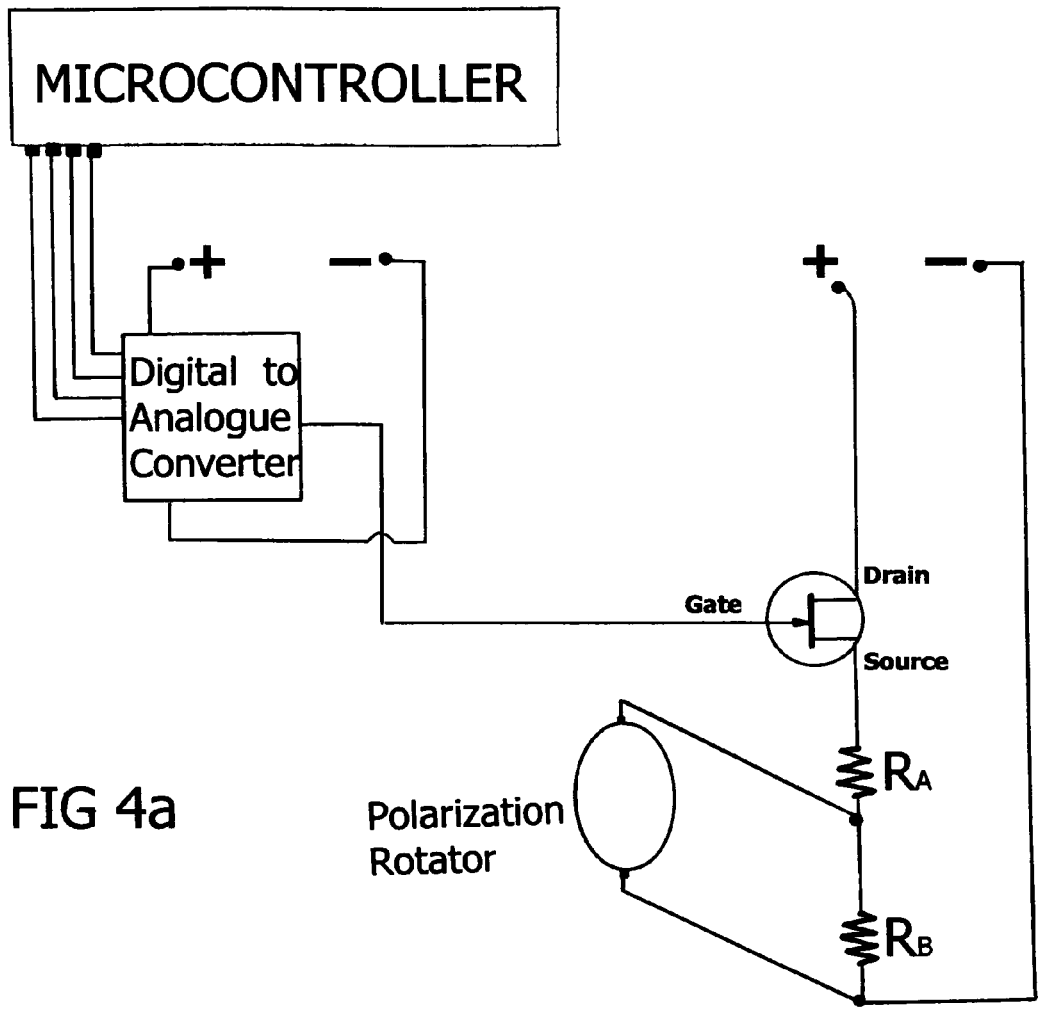
FIG 4a
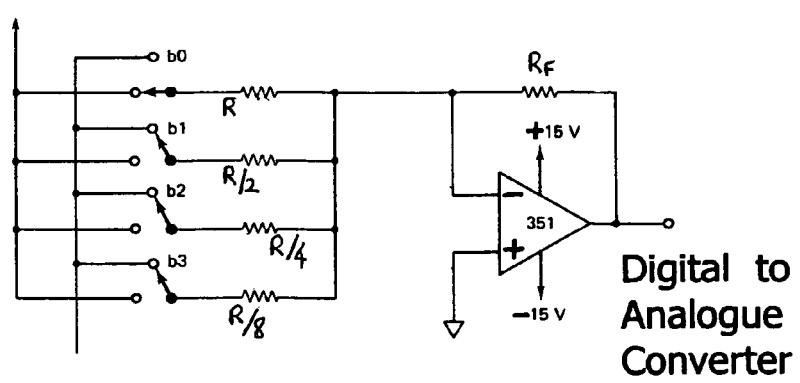

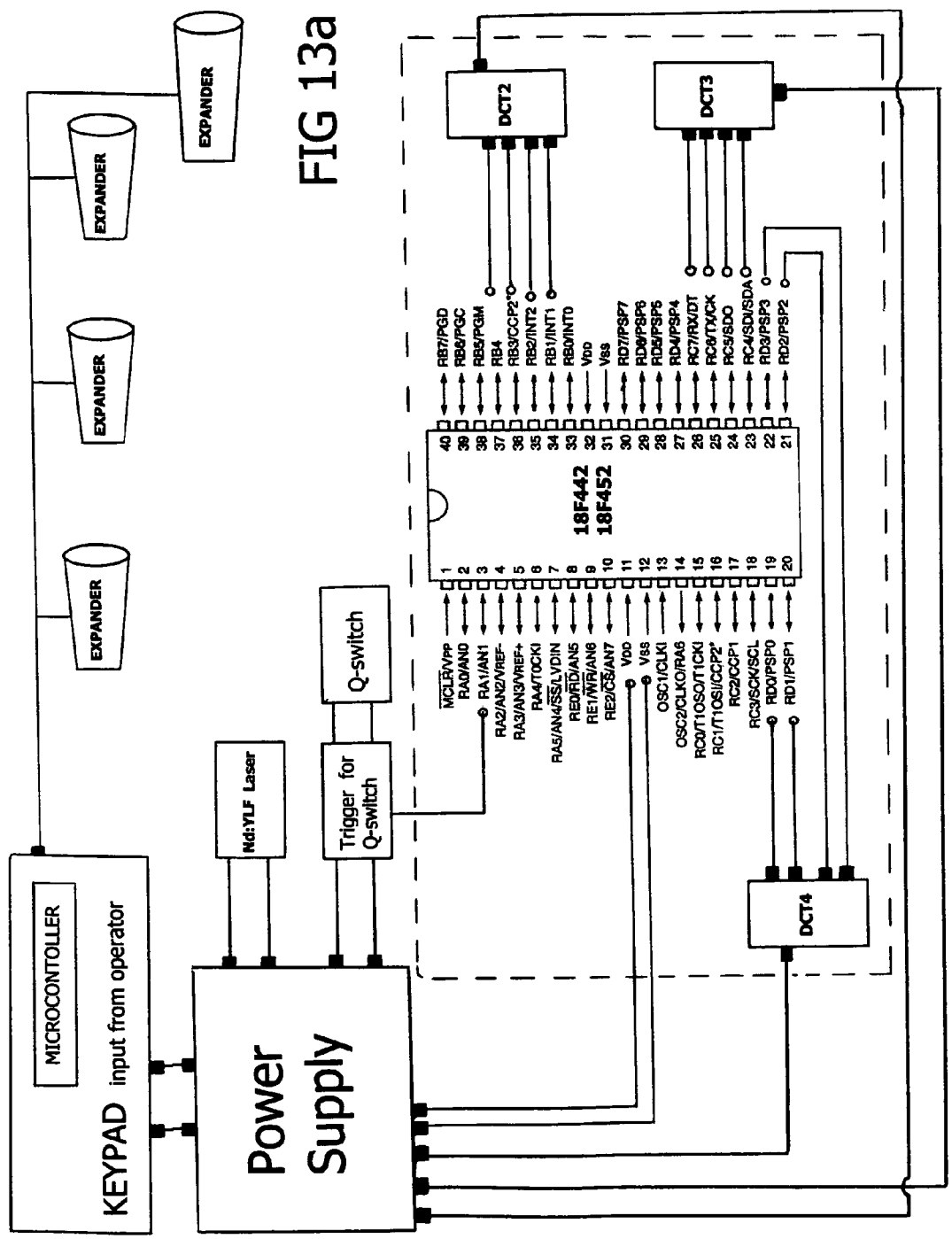

The PIC 18FXX2 Data Memory Map 000h to 07Fh; General Purpose RAM
F80h to FFFh; Special Function Registers

| Address | Name | Address | Name | Address | Name | Address | Name |
|---|---|---|---|---|---|---|---|
| FFFh | TOSU | FDFh | INDF2[3] | FBFh | CCPR1H | F9Fh | IPR1 |
| FFEh | TOSH | FDEh | POSTINC2[3] | FBEh | CCPR1L | F9Eh | PIR1 |
| FFDh | TOSL | FDDh | POSTDEC2[3] | FBDh | CCP1CON | F9Dh | PIE1 |
| FFCh | STKPTR | FDCh | PREINC2[3] | FBCh | CCPR2H | F9Ch | — |
| FFBh | PCLATU | FDBh | PLUSW2[3] | FBBh | CCPR2L | F9Bh | — |
| FFAh | PCLATH | FDAh | FSR2H | FBAh | CCP2CON | F9Ah | — |
| FF9h | PCL | FD9h | FSR2L | FB9h | — | F99h | — |
| FF8h | TBLPTRU | FD8h | STATUS | FB8h | — | F98h | — |
| FF7h | TBLPTRH | FD7h | TMR0H | FB7h | — | F97h | — |
| FF6h | TBLPTRL | FD6h | TMR0L | FB6h | — | F96h | TRISE[2] |
| FF5h | TABLAT | FD5h | T0CON | FB5h | — | F95h | TRISD[2] |
| FF4h | PRODH | FD4h | — | FB4h | — | F94h | TRISC |
| FF3h | PRODL | FD3h | OSCCON | FB3h | TMR3H | F93h | TRISB |
| FF2h | INTCON | FD2h | LVDCON | FB2h | TMR3L | F92h | TRISA |
| FF1h | INTCON2 | FD1h | WDTCON | FB1h | T3CON | F91h | — |
| FF0h | INTCON3 | FD0h | RCON | FB0h | — | F90h | — |
| FEFh | INDF0[3] | FCFh | TMR1H | FAFh | SPBRG | F8Fh | — |
| FEEh | POSTINC0[3] | FCEh | TMR1L | FAEh | RCREG | F8Eh | — |
| FEDh | POSTDEC0[3] | FCDh | T1CON | FADh | TXREG | F8Dh | LATE[2] |
| FECh | PREINC0[3] | FCCh | TMR2 | FACh | TXSTA | F8Ch | LATD[2] |
| FEBh | PLUSW0[3] | FCBh | PR2 | FABh | RCSTA | F8Bh | LATC |
| FEAh | FSR0H | FCAh | T2CON | FAAh | — | F8Ah | LATB |
| FE9h | FSR0L | FC9h | SSPBUF | FA9h | EEADR | F89h | LATA |
| FE8h | WREG | FC8h | SSPADD | FA8h | EEDATA | F88h | — |
| FE7h | INDF1[3] | FC7h | SSPSTAT | FA7h | EECON2 | F87h | — |
| FE6h | POSTINC1[3] | FC6h | SSPCON1 | FA6h | EECON1 | F86h | — |
| FE5h | POSTDEC1[3] | FC5h | SSPCON2 | FA5h | — | F85h | — |
| FE4h | PREINC1[3] | FC4h | ADRESH | FA4h | — | F84h | PORTE[2] |
| FE3h | PLUSW1[3] | FC3h | ADRESL | FA3h | — | F83h | PORTD[2] |
| FE2h | FSR1H | FC2h | ADCON0 | FA2h | IPR2 | F82h | PORTC |
| FE1h | FSR1L | FC1h | ADCON1 | FA1h | PIR2 | F81h | PORTB |
| FE0h | BSR | FC0h | — | FA0h | PIE2 | F80h | PORTA |

The PIC 18FXX2 Series
Special Function Registers (2) Denotes that this register is available on PIC 18F442 and PIC 18F452 Microcontrollers

FIG 13d

(3) Denotes that this is not a Physical Register

ARRAYED COHERENT WAVEFRONT EXPANSION DEVICE FOR PULSED REFLECTION HOLOGRAPHY

RELATED APPLICATIONS

This present invention requires an Electro-Mechanical alignment system previously described in U.S. patent application Ser. No. 12/313,882 filed 26 Nov. 2008 (U.S. Patent Publication Number; 2010 0128368) now abandoned.

BACKGROUND OF THE INVENTION

1. Field of the Invention

The apparatus of this disclosure is related to the field of pulsed reflection holography and in particular the multiplexing of holographic images of a moving object by rotating the plane of polarization of the coherent lightwave with one intended application being portraiture however, this apparatus could be used to record interference fringes from any kind of moving object moving in close proximity to the recording window of the apparatus. The invention disclosed herein which enables the multiplexing of several holographic images in sequenced intervals of time and space is made possible with the invention of the Hollow Core Photonic Crystal Fiber (HC-PCF) also known as a Birefringent photonic bandgap optical waveguide is described in U.S. Pat. No. 7,321,712 and U.S. Pat. No. 7,805,038. Methods for the production of photonic crystal fibers given in U.S. Pat. No. 6,985,661 and U.S. Pat. No. 7,305,164

2. Description of the Prior Art

A hologram has been described as being a 'window with a memory' because the light sensitive recording medium not only records the intensity of the monochromatic light rays that impinge upon the surface of the material but also information as to the phase difference between these monochromatic wavefronts for an instantaneous moment in time.
Not only are the strengths of the monochromatic wavefronts able to be reproduced but also the directions from the points in space from where the wavefronts emanated and in this sense the hologram is a recording of the entire information contained within the microscopic interference fringe pattern and thus, looking at the light sensitive surface is like looking through a window with a memory but more correctly it is a window with a complete memory. The theoretical basis for split beam holography is obtained through an analysis of the intensity distribution function which is as follows; if the field distribution of the reference lightwave impinging upon the recording material is $\psi_r = A_r \text{EXP}[-i\phi_r]$ and if the field distribution of an object lightwave impinging upon the recording material is; $\psi_o = A_o \text{EXP}[-i\phi_o]$ (where $A_r$; $A_o$; $\phi_r$; $\phi_o$ represent the corresponding Amplitude and phase distributions of the lightwaves) then the resultant Intensity distribution I will be;

$$I = [\psi_r + \psi_o]^2 =$$
$$(A_r)^2 + (A_o)^2 + (A_r \cdot A_o)\text{EXP} - i[\varphi_o - \varphi_r] + A_r A_o \cdot \text{EXP} - i[\varphi_o - \varphi_r]$$
$$I = (A_r)^2 + (A_o)^2 + 2(A_r \cdot A_o)\text{EXP} - i[\varphi_o - \varphi_r] \text{ or}$$
$$I = (A_r)^2 + (A_o)^2 + 2(A_r \cdot A_o)\cos(\varphi_o - \varphi_r)$$

This last term is most interesting because it represents the phase difference between the reference and object lightwaves.

In discussing the prior Art it is necessary to mention one of the earliest methods of multiplexing holographic images superimposed on the same position in a recording medium which was to alter the angular direction at which the reference beam is projected onto the recording medium which is known as angular multiplexing. This method does have the drawback that it requires the mechanical movement of optical elements. In U.S. Pat. No. 3,970,357 Moraw and Schadlich disclose a method to enable the multiplexing of holographic images on a single recording medium by using a beveled conical mirror such that the recordings are made at incremental angles between the object beam and the reference beam. This angle between the reference beam and the plane of the recording medium is referred to as the 'azimuth angle'. In U.S. Pat. No. 5,696,613 Redfield and Trisned disclose a method of multiplexing pages of data holographically at locations in a thin storage media using differing planes of incidence for the reference beam to interfere with the object beam by which a deflection system deflects the reference beam.

In U.S. Pat. No. 6,862,121 B2 Psaltis and Co-inventors disclose an apparatus which uses a frequency doubled Q-switched Nd:YAG laser to generate reference and signal pulse trains and a CCD camera to record holographically captured time sequenced ultra-fast phenomena which is angular multiplexed in a recording medium. It is necessary to mention that the optical circuit of which this apparatus comprises is highly complex. In U.S. Pat. No. 7,362,482 Kihara discloses a method of multiplexing pages of data using an inline type speckle multiplexed hologram recording and reproducing apparatus in which laser light is introduced into a spatial light modulator and intensity modulated by the spatial light modulator. Interference between the intensity modulated signal light and the reference light is captured in a recording medium. In U.S. Pat. No. 7,710,845 Yoshiyuki and co-inventors describe a holographic recording apparatus that enables the recording of information onto a disc by angle multiplexing of which the disc is a type of photopolymer recording medium.

Amongst the various methods of multiplexing is spatial multiplexing which refers to rotating the recording medium in the plane perpendicular or near perpendicular to the directions of travel of the reference and object light. However, if the direction of polarization of the laser beam can be rotated then this would also achieve spatial multiplexing. There are presently components which enable the direction of polarization to be rotated. Such a component which can be embedded into an apparatus to rotate the direction of polarization of monochromatic light is disclosed by Simony and co-inventors in U.S. Pat. No. 4,579,422. This device uses a liquid crystal composition held between glass plates which rotates the polarization of monochromatic light as a function of applied voltage. An elaborate polarization rotation waveguide device is disclosed in U.S. Pat. No. 5,243,669

The apparatus of this invention requires components that deflect the path by which laser light is traveling when this path is in the transverse direction to the plane of the front surface of the component. These components are known as switchable diffractive elements or switchable optical components and are disclosed in U.S. Pat. No. 5,937,115 by Domash and also in U.S. Pat. No. 6,567,573 by Domash. This invention also requires an advanced Q-switched Nd:YLF/phosphate Glass Laser. The theoretical blueprint for these lasers is described in the following article 'DESIGN OF A FAMILY OF ADVANCED Nd:YLF/PHOSPHATE GLASS LASERS FOR PULSED HOLOGRAPHY' by Grichine; Ratcliffe and Rodin published in SPIE proceedings Volume 3358 pages 194 to 202. Another development in Laser Science and technology that also could be used to provide the coherent light source for this invention are optically pumped semiconductor lasers. These devices are described in U.S. Pat. No. 7,447,245 by Caprara and Co-inventors and U.S. Pat. No. 7,991,026 by Caprara. These devices would also be ideal providing they can be Q-switched.

SUMMARY OF THE INVENTION

All methods of multiplexing Holograms in a single recording medium mentioned so far enable this multiplexing of time sequenced events only. That is; events taking place at spaced intervals in time within a specified duration in time. The invention of this present disclosure allows for this capability to be extended such that the time sequenced events can now be recorded over incremental points in space. The invention of the hollow Core Photonic Crystal Fiber (HC-PCF) enables an arrangement whereby the modulated object beam can emanate from different points in space for each of the time sequenced events being recorded.

Shown in FIG. 1 is a simplified optical circuit of which comprises for the most part, the apparatus of this invention. The main embodiment of this invention is such that the object beam can be switched into either one of four or eight or more paths where each path is defined to be within the confines of the Hollow Core Photonic Crystal Fiber (HC-PCF) and where these paths terminate into a series of double concave lenses through which the object beam diverges out into space. The term object beam should be interpreted as being a coherent pulse of laser light however, for the purpose of aligning all components in the apparatus after initial assembly of the apparatus is completed, coherent constant wave laser light would be used in the testing procedure and similarly be expanded out in space but it must be kept in mind that the apparatus of this invention has to be operated in pulsed mode for holography.

The termination point for the object beam which consists of a series of double concave lenses through which the object beam diverges into space are arranged such that one of these double concave lenses is electronically adjustable so to control the degree by which the object beam diverges out into space and this will depend of course on the size of the object being recorded as a series of multiplexed holograms. These four or eight or more termination points which I will refer to from now onwards as WAVEFRONT EXPANDERS are arranged arrayed around a 120 degree tangential arc in space. These ARRAYED wavefront expanders situated around this tangential arc in space enable adjustment of the object wavefront to be either expanded or contracted. These wavefronts are COHERENT and I reiterate that the WAVEFRONTS can be EXPANDED. Hence the acronym; Arrayed Coherent Wavefront Expansion Device; ACWED The termination end of each wavefront expander is required to be fitted with a linear polarizing filter which will allow only the component of the selected object beam to pass which is in the same plane of polarization as the reference beam.

As is well known in holography, the direction of polarization for the object beam must be in the same direction to that of the polarization of the reference beam for interference fringes to be efficiently created in the recording medium. This is of special importance to another embodiment of this present invention as the multiplexing is achieved by rotating the direction of polarization of the wavefronts which could be called spatial multiplexing, but this term spatial multiplexing originally referred to rotation of the recording medium alone. The apparatus of the invention could enable either the recording medium to be rotated or the direction of polarization to be rotated or both to be rotated at precise moments within the recording time interval. It will be described in the detailed description in which this invention is used for a recording sequence within a one second time frame that only the polarization of the reference and object lightwaves will be rotated at sequenced intervals in this time frame. However, should the apparatus be designed such that the recording medium rotates then a recording medium in the form of a circular disk is ideally suited for rotation where the rotation is to be interpreted as being the rotation around the plane which defines the surface of the recording medium.

Shown in FIG. 1 is a microcontroller and amplifier stage required to trigger the spatial polarization for each times sequenced recordings and also the microcontroller is required to adjust the expansion and contraction of object and reference beam wavefronts where the term wavefront is referring to a pulsed wavefront as was previously conveyed. The microcontroller is programmed to execute a specified duration for the timed sequenced recordings. An output Pin of the microcontroller will trigger the Q-switch of the laser and thus, voltage amplification and voltage tripling circuits are required between the output pin of the microcontroller and the Q-switch The incremental points around a periphery in space in which the wavefront expanders are stationed can be manually adjusted as it is conceived in this disclosure that the Hollow Core Photonic Crystal Fiber waveguide will be supported inside a flexible metal pipe the kind of pipe that is used in constructing various models of desk lamps. This flexible metal pipe is known as 'gooseneck' by manufacturers of desk lamps. This 'gooseneck' pipe will not only be a support for the Hollow Core Photonic Crystal Fiber Waveguide (HC-PCF) but will also carry the wiring needed to connect to and control the object wavefront expansion-contraction lens adjustment mechanism housed within the wavefront expanders. The Hollow Core Photonic Crystal Fiber Waveguide will be referred to from now onwards by the acronym HC-PCF. The wavefront expanders are directed about the incremental points in space such to cause the best deflection of the object wavefronts off an object and onto the recording medium. The recording medium used to test the apparatus was a fine grain silver halide emulsion spun coated on sheets of Cellulose Acetate, however, Cellulose Tri-acetate is recommended but it is difficult to obtain. Polyethylene Terephthate is also used as a film substrate but it should not be used in practicing with this invention because this material is birefringent and will diminish the quality of the final result. The silver Halide Emulsion was prepared as given in the following article; 'ULTRA-FINE GRAIN SILVER HALIDE EMULSIONS FOR COLOR REFLECTION HOLOGRAPHY; PREPARATION AND SPECTRAL CHARACTERIZATION' by Iwasaki and Kubota published in SPIE proceedings Volume 3358 Pages 54-63. The developer used in the development process is based on Catechol; The CW-C2 developer which is well known by those skilled in the Art and first described in the following article; REFLECTION HOLOGRAM PROCESSING FOR HIGH EFFICIENCY IN SILVER HALIDE EMULSIONS published in the Journal of applied Optics Volume 23 (1984) pages 934 to 941. A circular film holder is suggested for the apparatus which can hold a circular film substrate. A circular film substrate of 400 mm diameter is suggested. It is not essential that the film holder and film substrate be circular. A square film holder would suffice. But a circular film holder appears to give the apparatus good aesthetics.

Processing of the exposed silver halide disc requires a developer as is well known by those skilled in the art of holography. A developer solution will turn the colourless latent image into an opaque developed image. The action of the developer can be stopped after an appropriate time by moving the disc to a mildly acidic stop bath. A fixer can then be used to remove unexposed silver halide leaving only silver. The holographic recording obtained is known as an amplitude hologram but a further processing step can be performed to obtain a phase hologram which will give a brighter image. This further processing step is known as bleaching. In performing this step it is recommended to use a physical transfer bleach such as Ferric Sodium EDTA. However, in this case the fixing step is not performed.

BRIEF DESCRIPTION OF THE DRAWINGS

FIG. 1b shows the optical configuration only.

FIG. 4a is a suggested circuit using a Digital to Analogue converter to supply the triggering of stepped voltages to the polarization rotator.

FIG. 13a is a Block diagram of the electronic timing and control circuit using a PIC 18FXX2 microcontroller and FIG. 13b is the circuit with the CCD and support circuitry added. FIG. 13d shows the PIC 18FXX2 Special Function Registers

DESCRIPTION OF THE PREFERRED EMBODIMENTS

Hollow Core Photonic Crystal Fiber (HC-PCF) and support pipe
Polarization Rotation Element and Trigger
Switchable beam deflection apparatus
Translating lens movement enabling wavefront expansion-contraction

Hollow Core Photonic Crystal Fiber (HC-PCF) and Support Pipe

The apparatus of this disclosure is made possible with the invention of the Hollow Core Photonic Crystal Fiber which is an ideal waveguide for the apparatus. To convey an understanding of the HC-PCF it is first necessary to mention the fiber Bragg grating which is an optical fiber modified such that the refractive index of the fiber varies periodically along the length of the Fiber. At a wavelength known as the Bragg wavelength the light wave encounters a high reflectivity and also wavelengths of light close the Bragg wavelength encounter high reflectivity. The range of wavelengths for which the light is reflected is known as the 'Stop Band' with the existence of the stop band implying a gap in the spectrum of allowed propagation frequencies i.e. a 'Photonic Bandgap'

Figure 2:
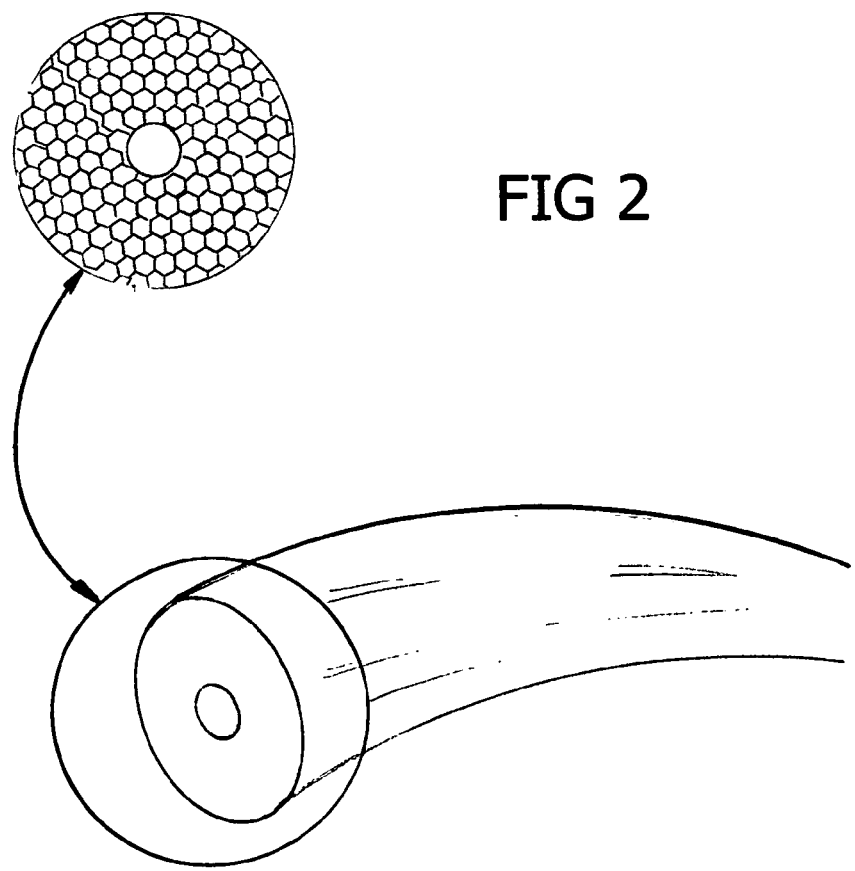
FIG. 2 shows a cross sectional view of a micro structured Hollow Core Photonic Crystal Fiber

A distinguishing feature of the HC-PCF shown in FIG. 2 is that the core is hollow and there is a Photonic Bandgap in the cladding. In a conventional fiber, the light is confined to the core by total internal reflection providing there is a higher refractive index in the core than what there is in the cladding. In a conventional fiber, a hollow core would not guide a coherent light wave efficiently because the refractive index of the hollow core would be lower than the refractive index of the cladding. But with the HC-PCF this is not the case. With a HC-PCF the guiding of the light is due to the photonic bandgap in the cladding The HC-PCF utilized as a waveguide possess the great asset that the coherent property of a light wave being guided through the fiber will be unaffected provided that the design of the HC-PCF is such that the fiber can handle the power of the coherent light wave otherwise non-linear processes could take place. It must be stressed that in using conventional optical fiber as a waveguide, the coherency of the light wave would diminish and would not be useful for creating an interference fringe pattern as is fundamental to the embodiment of this invention.

Figure 3:
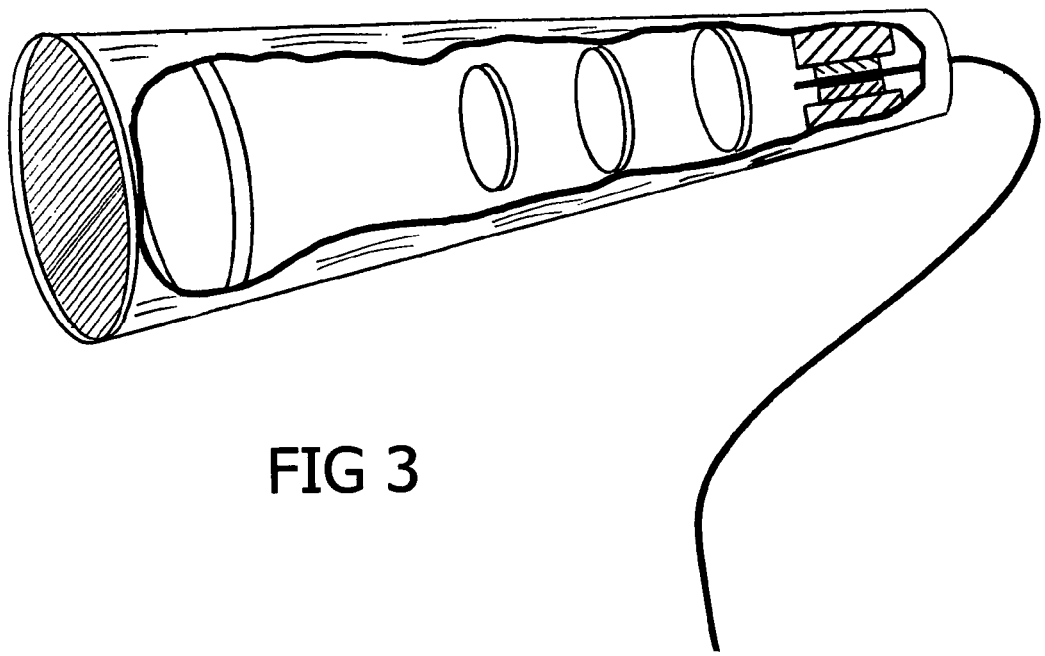
FIG. 3 shows the HC-PCF waveguide joining into the wavefront expanders

The HC-PCF waveguide joins each output path of each of the arrayed wavefront expanders as shown in FIG. 3. It is essential that the coherent pulse exiting each output of each of the arrayed switchable optical elements be collimated and ideally collimation is best provided by a Plano Convex lens. A suitable diameter is 6.3 mm. A holding mount for the HC-PCF stationed at the exit of each output path will require ultra-fine adjustment in the X-Y directions such that the coherent pulse can be directed precisely into the Hollow core of the HC-PCF. The HC-PCF will be housed inside flexible 'gooseneck' pipe. This type of Pipe is used for the construction of some models of desk lamps.

Polarization Rotation Element and Trigger

The lightwave delivered from the pulsed laser light source used for this apparatus will be linearly polarized. This lightwave will first encounter an optically active device being such a device which rotates the direction of vibration of the linearly polarized light wave. Materials which can rotate the direction of linearly polarized light such as crystalline Quartz are well known by those skilled in this art that's a grown from advances in optical electronics. The degree of rotation caused by this solid is a function of the thickness of the sample of which the light wave passes through however a device is required of which the degree of rotation of the linearly polarized light wave is a function of an applied voltage pulse and these devices composed of liquid crystals are previously mentioned. In this embodiment it is assumed that there is generally a linear relationship between the applied voltage applied to the polarization rotator and the degree by which the linear polarized light wave rotates.

Figure 4C:
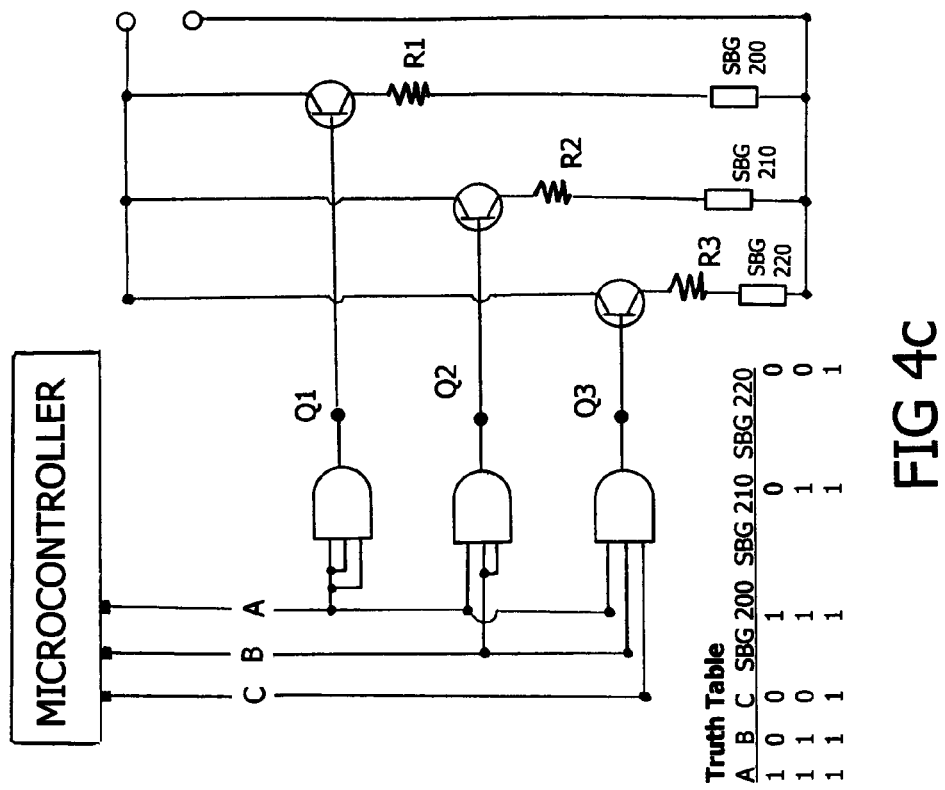
FIG. 4c is a suggested logic circuit to supply the triggering voltages to the Switchable Bragg Gratings
Figure 5C:
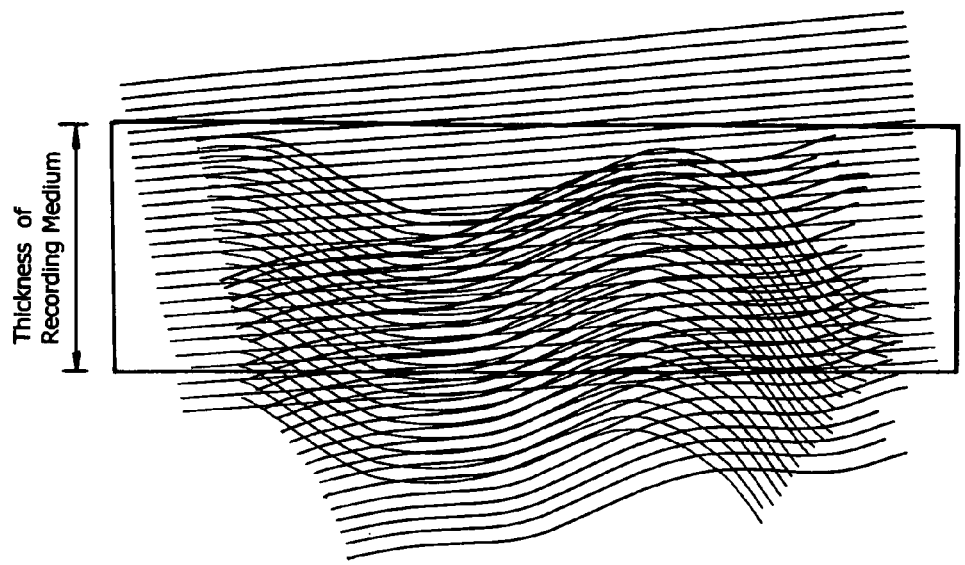
FIG. 5c is a representation of two interference recordings
Figure 5B:
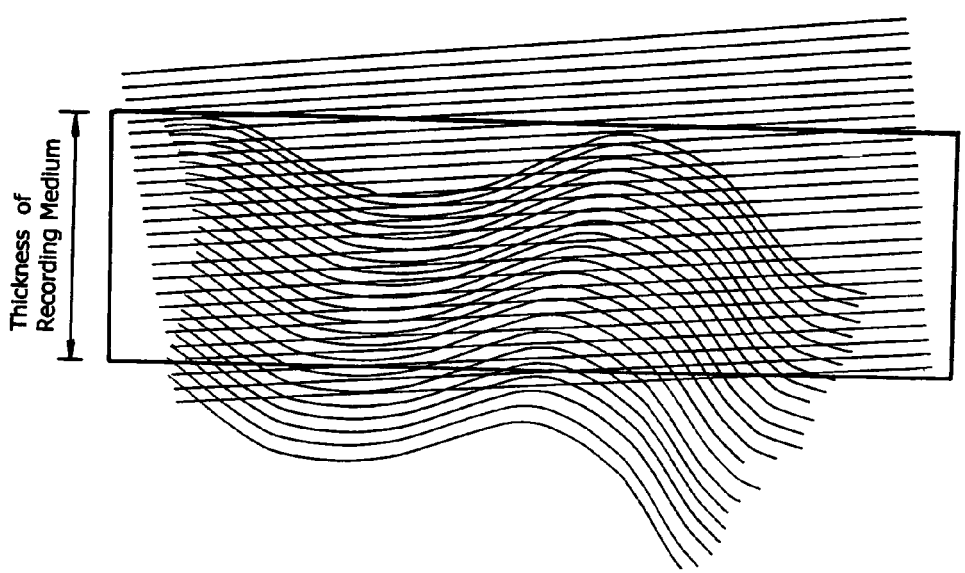
FIG. 5a shows the reference beam impinging upon the recording medium
FIG. 5d is a representation of three interference recordings FIG. 6 Shows the Switchable Beam Apparatus
Figure 5A:
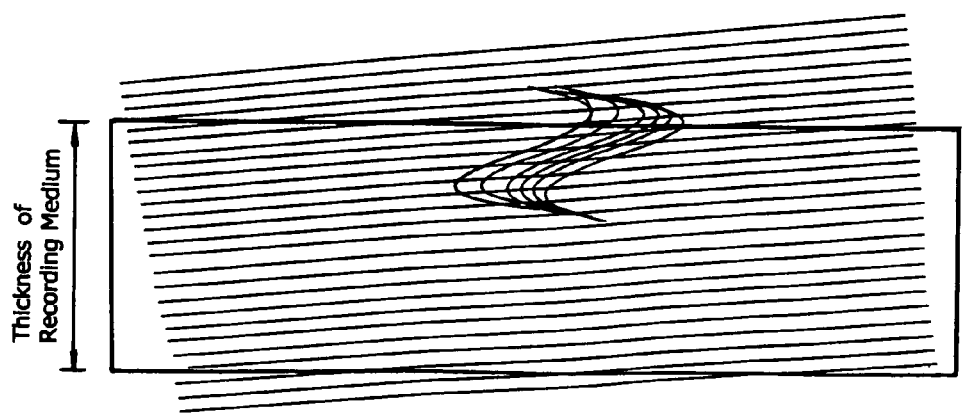
Figure 6:
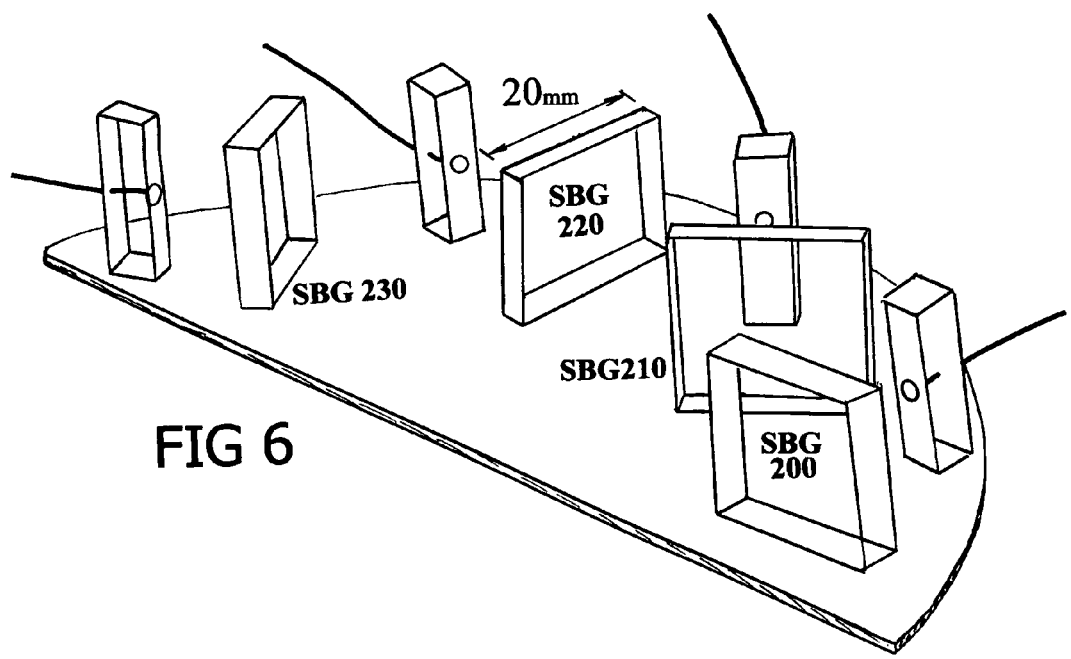

The polarization controller is connected to a voltage divider. The voltage divider is connected to the collector-emitter path of a Field Effect Transistor (FET) as shown in FIG. 4. The triggering voltage pulse or 'high' is sent from the microcontroller to the Analogue to Digital converter in a timed sequence. It is desirable that the spatial multiplexing occur at equidistant angles around the front surface of the light sensitive film. In the application of this invention described this spatial multiplexing is designed such that the necessary voltage pulse is to cause stepped rotations of 90 degrees; 180 degrees; 270 degrees. The voltage will develop across the output resistor of the voltage divider. In this case there can be four multiplexed recordings; one at 0 degrees; another at 90 degrees; another at 180 degrees; another at 270 degrees. Should 8 multiplexed recordings be required at equidistant angles around the film then the same circuit can be used to deliver the stepped voltages. The degrees of rotation will be; 0; 45; 90; 135; 180; 225; 270; 315; degrees Shown in the FIGS. 5b and 5c; are two multiplexed interference recordings on the circular light sensitive film/recording medium. There is however a drawback to multiplexing several recordings on a single light sensitive film; as more recordings are made on the one film the efficiency by which each one will be seen to replay will reduce Switchable Beam Deflection Apparatus This embodiment of the invention provides a non-mechanical method for the light wave to be sequentially switched into the HC-PCF waveguides thus enabling a series of sequentially timed object beams in space. Each object beam which should be understood to be a light wave pulse used as the object beam is synchronized to interfere with a reference beam light wave pulse within the timed sequence and where the timed sequence coincides for both the object and reference light wave pulses. The apparatus of this embodiment comprises of Switchable Bragg Gratings (SWG) previously mentioned and front surface mirrors as well as a series of fiber optical cable holding barrels and barrel mounts of which these barrel mounts incorporate ultra-fine adjustment as shown in FIG. 6
to enable alignment of the light wave directly into the centre of the HC-PCF waveguides. Each SBG is connected to electrodes and where each SBG is activated by a voltage pulse. The special property of the SBG is to enable deflection of the light wave through an angle φ as the light wave passes through the SBG. The deflection of the light wave through angle φ is activated by the application of a pulsed voltage of which this voltage magnitude being intrinsic to a particular SBG device design specification.

Figure 7:
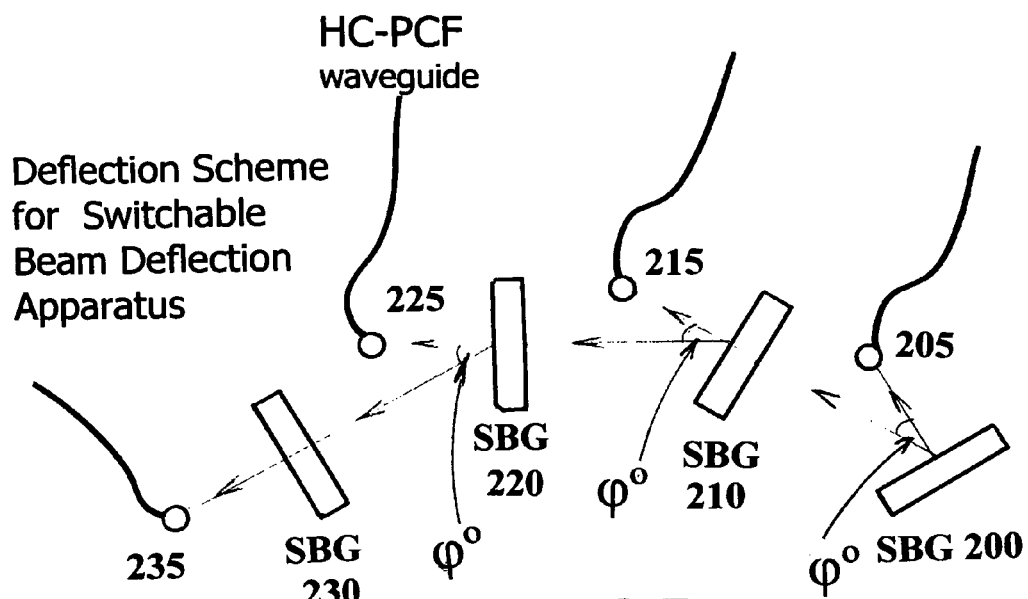
FIG. 7 is Schematic of the switching scheme

Shown in FIG. 7 is a schematic of a switching scheme now described. As the reflected light wave exits the side of the beam splitting cube this reflected light wave then encounters the SWG switching apparatus so to be switched into the HC-PCF waveguides. This light wave first encounters SBG 200. At any moment in time when SBG 200 is NOT activated then the light wave pulse will enter into the entry point at 205 into a plano-convex lens to be focused into the centre of the HC-PCF 1 waveguide. At the moment in time when SBG 200 is activated then the light wave pulse will be deflected or 'switched' into a path that is perpendicular to SBG 210

At any moment in time when SBG 210 is NOT activated then the light wave pulse will enter into the entry point at 215 into a plano-convex lens to be focused into the centre of the HC-PCF 2 waveguide. At the moment in time when SBG 210 is activated then the light wave pulse will be deflected or 'switched' into a path that is perpendicular to SBG 220

At any moment in time when SBG 220 is NOT activated then the light wave pulse will enter into the entry point at 225 into a plano-convex lens to be focused into the centre of the HC-PCF 3 waveguide. At the moment in time when SBG 220 is activated then the light wave pulse will be deflected or 'switched' into a path that is perpendicular to SBG 230. At any moment in time when SBG 230 is NOT activated then the light wave pulse will enter into the entry point at 235 into a plano-convex lens to be focused into the centre of the HC-PCF 4 waveguide.

The mechanical design criteria of the apparatus of this embodiment requires that all SBG's and front surface mirrors and fiber holding mounts be fitted securely into slotted holes in the mounting base. Ultra-fine adjustment incorporated into the mounting barrels enabling alignment of the light wave into each HC-PCF will require ultra-fine threaded screws with standard 80 threads in one inch to provide micrometer adjustment of the positioning of the mounting barrels.

Translating Lens Movement Enabling Wavefront Expansion-Contraction

Figure 8:
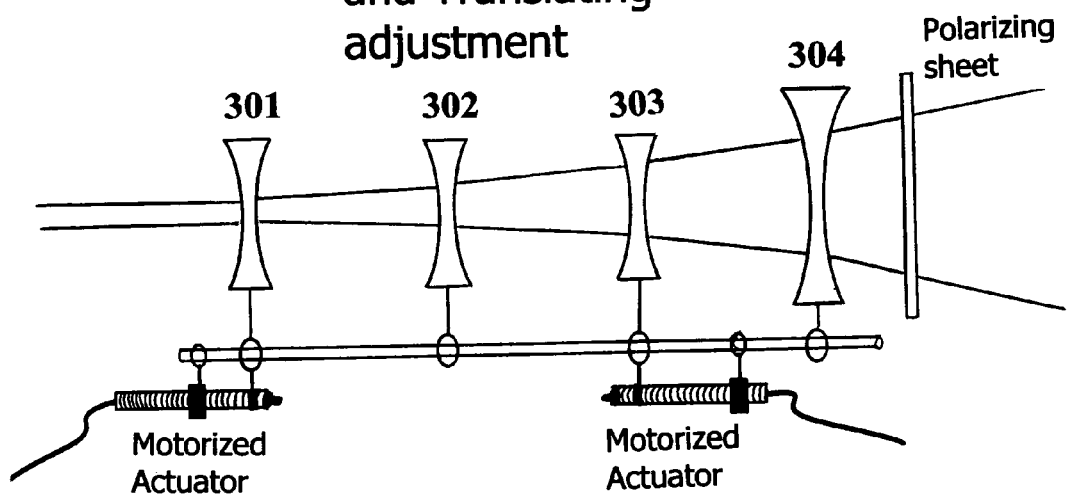
FIG. 8 shows the concave lenses connected to motorized actuators to enable beam expansion and contraction
Figure 9:
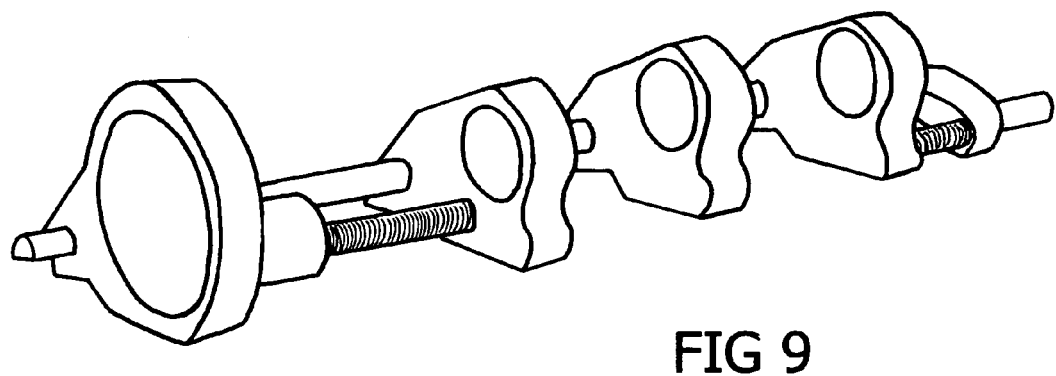
FIG. 9 shows how the wavefront expander is formed using a translating optical mounting apparatus FIG. 10 provides a representation of beam expansion and contraction

The apparatus of this embodiment provides for the expansion-contraction of the coherent object beam wavefront of which there are several object beam wavefronts. As each of the coherent lightwaves exists each HC-PCF waveguide the lightwave of which the lightwave refers to pulsed laser light passes through and along the optic axis of three double concave lenses as shown in FIG. 8. Two of the double concave lenses 301 and 303 are connected to a motorized adjustment mechanism consisting of a DC servo motorized actuator, and translation movement along the optic axis. Lens 302 is held stationary. Such motorized adjustment enables lenses 301 and 303 to be moved such that the coherent wavefront can either expand or contract from a present state of vergence. Lenses 301 and 303 move equal distance away from or towards stationary lens 302. It should thus be recognized that as the coherent wavefront expands or contracts along the optic axis of this concave lens arrangement, the degree of this vergence is made adjustable.

Figure 10:
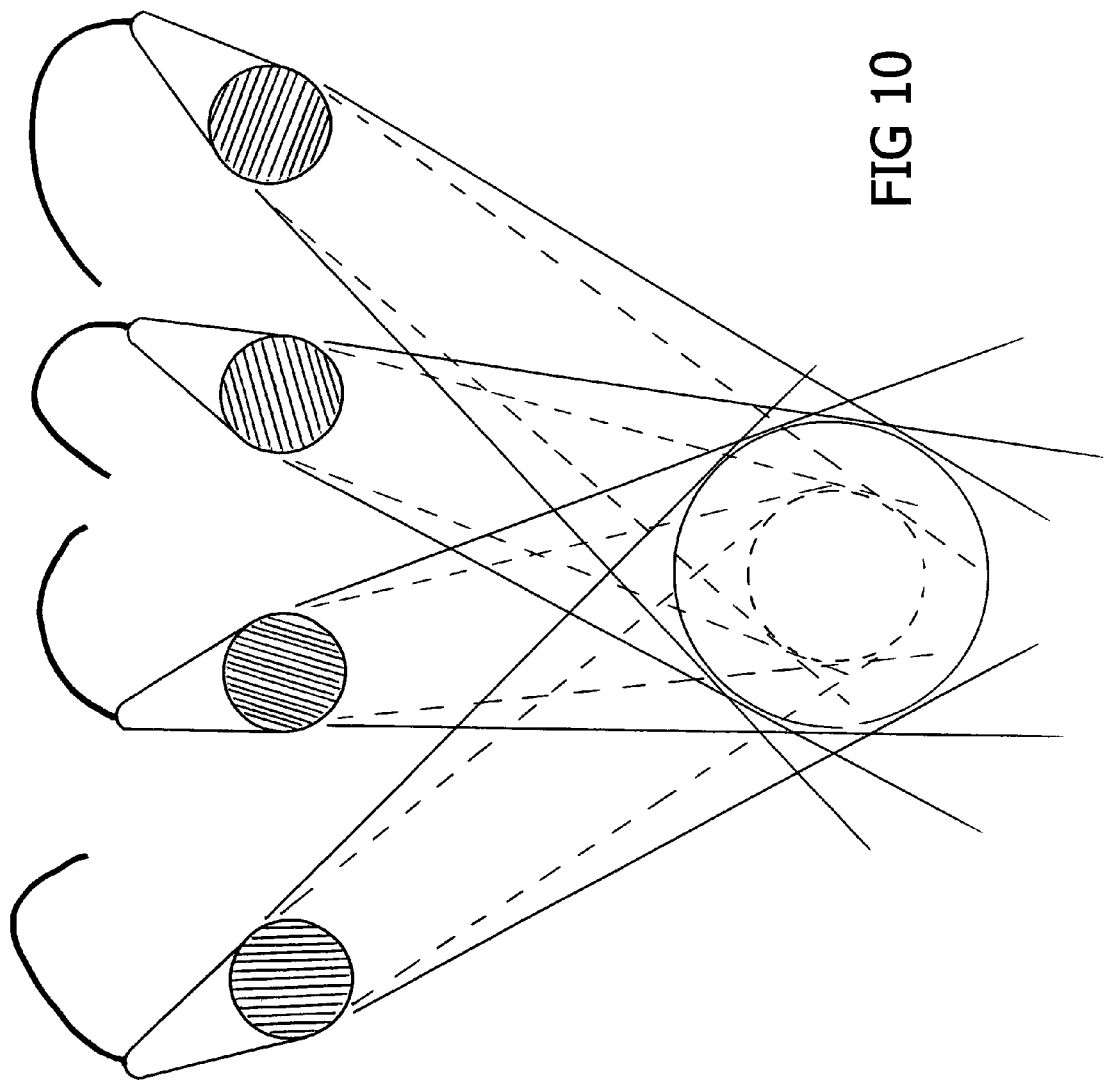

Experimentation with collimated constant wave laser light shows that three double concave lenses of one inch diameter facilitate a square recording window of approximately 200 millimeters by 200 millimeters however a large recording window can be achieved by adding an additional lens along the optic axis where the additional lens which further expands the wavefront is a planar-concave lens of 2 inches diameter. As shown in FIG. 8, this additional 2 inch diameter planar-concave lens 304 could be joined by additional one or two or three 2 inch planer-concave lenses depending on how large the recording window is anticipated to be. In this case, these 2 inch planar concave lenses should be joining or touching. the recording window should be understood to refer to the dimensions of a loosely defined space in front of the recording medium which can extend a distance of approximately 100 millimeters to 400 millimeters from the recording medium of which this distance should be understood to refer to the distance between the object and the recording medium. This feature of the invention which enables an adjustable size for the object beam wavefront as shown in FIG. 10 must be facilitated by an adjustable size of the reference beam wavefront. Thus, the vergence of the reference wavefront must adjust according to that by which the vergence of the object wavefronts are diverging.

An identity pertaining to the amount of expansion-contraction of the object beam wavefronts as a function of lens divergence power can be obtained. The change in vergence from one side of one concave lens to the other side of the lens and is given by;

refracting power; $Pr=1/f$ where f is the focal length of the lens.

When the lenses are placed is series along the optic axis the focal lengths of the combination can be found in terms of the focal lengths of each of the lenses where $1/f\text{total}=1/f1+1/f2+1/f3+\ldots+\ldots$ but this identity is only applicable when the lenses are placed together along the optic axis. In the case of this embodiment of the apparatus where there is an adjustable distance L between the three one inch double Concave Lenses in the lens combination, the refracting power of this three lens combination will be adjustable according to Total refractive power; $Pr=KLPr1+KLPr2+KLPr3$ where k is a constant and L is the distance of the lens away from the neighboring lens in the combination, and where Pr1 and Pr2 and Pr3 are the refractive power of the individual lenses. If lenses 301 and 303 move outward at equal distance of Ly by motorized translation adjustment, and if the distance of the two inch planar concave lens to the neighboring double concave lens is Lw, then the refracting power of this combination will be adjustable according to;

$Pr=KLy(Pr1+Pr2+Pr3)+KLwPr4$

The size of the object wavefront at a given distance away from the translating lens movement apparatus will be directly proportional to the total refracting power of the concave lens combination.

As the pulsed lightwave exits each wavefront expander it should pass through a polarizing filter upon exiting. The polarizing filter must be orientated in direction such that the only component of the linear polarized lightwave that is orientated in direction with the same direction of the reference lightwave will pass through. Such orientation in direction in synchronization of the object beam wavefronts with the reference beam wavefronts is for each of the instantaneous intervals of time sequenced recordings as previously described. For example, if the linear polarized pulsed reference lightwave is orientated at an angle of 45 degrees then the corresponding pulsed object lightwave must also be orientated at 45 degrees for the efficient recordings of interference fringes within the spatial multiplexing scheme. Thus, careful alignment to this synchronization is required at the polarization rotation design stage. FIG. 10 shows circular polarizing sheets attached on the outside of the Wavefront Expanders. These circular polarizing sheets should be attached so that these components can be manually rotated. This embodiment of the invention is not without difficulty and this difficulty arises during when the lightwave is being guided through the HC-PCF waveguide. The angle of orientation of the polarization at the instant in time upon entering the waveguide could be different upon exiting the waveguide. Should this problem be encountered then it could be overcome by movement of the HC-PCF waveguide in space. The waveguide will of course be housed inside flexible gooseneck pipe. In the worst case scenario in which this problem cannot be rectified, then the triggering circuitry could be re-designed so that the two polarization rotators operate independently. In the time sequenced operation to be described, the two polarization rotators will operate in synchronization. However, this is not essential. The two polarization rotators could operate independently. The microcontroller program would then require more complexity. The pulsed laser needs the capability to operate at constant wave so that the apparatus can be set-up such that in each timed sequenced recording, the angle of orientation of polarization of both the reference wave and the object wave can be observed to align. This can be observed by using use of sheets of polarizing filters. Shown in FIG. 10 are only four Expanders but the apparatus could use more of these Expanders and ideally these expanders should be placed around a tangential arc in space. An arc of 180 degrees would be ideal but difficult to attain. An arc of 120 degrees would be easy to attain.

It must be understood that this embodiment within the framework of the invention provides flexibility and efficiency in the recording process to maximize the amount of coherent object light being projected onto the object matter and thus can greatly enhance the recording outcome. Thus, the synchronization of dimension adjustable reference wavefront and object wavefront vergence in which the object wavefront is a series of wavefronts around a periphery in space brings flexibility and a unique controlling feature to a holographic recording apparatus of this method and methods of the prior art.

DETAILED DESCRIPTION OF THE INVENTION

The Laser

The design of the pulsed laser is most critical within the design of the invention. The most superior pulsed laser system at this time suitable for pulsed holography is an injection seeded frequency doubled Neodymium Glass Phosphate laser using the 1053 nm transition line of Nd:YLF which this crystalline solid emits under excitation. The generation of high coherence and high energy Nd:YLF/Glass Phosphate lasers previously mentioned are ideal for this invention. The design of the Q-switched Laser System requires that it fits within the allowable space in the main compartment of this transportable apparatus. A beam of high spatial quality is essential. A spatial filter used to block the low frequency noise in the laser beam is not a good choice within this invention as the spatial filter will diminish the power in the pulsed laser beam. Instead, the Nd; YLF/phosphate Glass laser system uses a Brillion Cell within the optics arrangement as a selective reflector which reflects the coherent beam without reflecting the noise.

Figure 1:
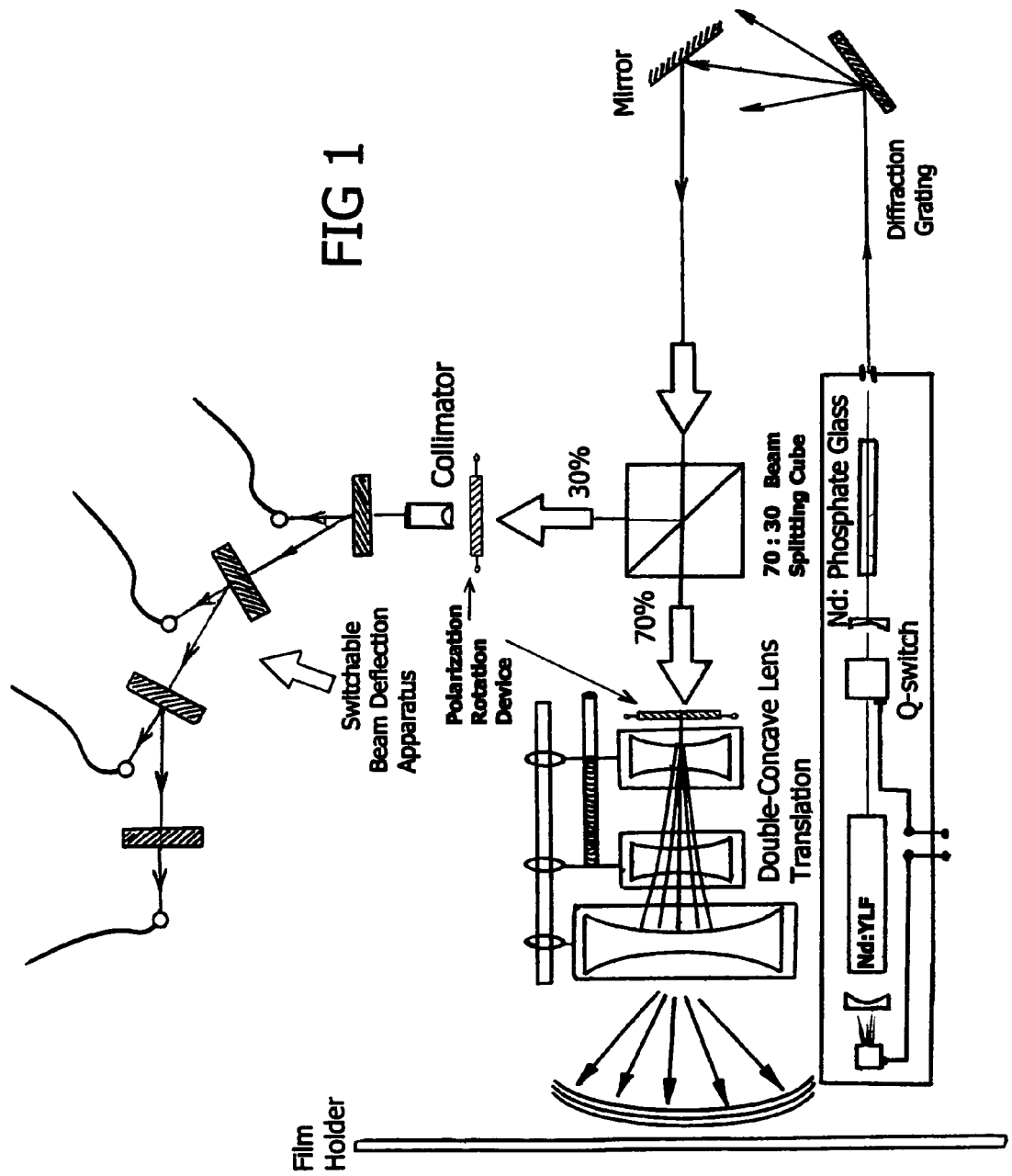
FIG. 1 shows a simplified layout of the optical-electronic configuration.

FIG. 1 is a simplified representation of the optical-electronic circuit and as shown in FIG. 1 the pulsed lightwaves exit the laser and are directed towards a diffraction grating. Depending upon the design of the laser more than one mode could be present in which case the diffraction grating can selectively deflect the highest intensity mode into the apparatus and the other modes deflected out of the Instrument case. However, if the lightwave consists of only one mode with no other modes of any significant amplitude present, then in this case, instead of the lightwave exiting the laser to be deflected by a front surface mirror to a diffraction grating the lightwave could be directed directly into an HC-PCF waveguide to be directed into the beam splitter.

The Beam Splitter

The Beam Splitter recommended for this apparatus is a polarizing cube beam splitter as this beam splitter can handle a concentrated pulse of laser light without being damaged. It is well known by those skilled in the art of holography that the reference beam has to be stronger than the object beam so that the object beam modulates the reference beam. Also the object will contain noise which is unavoidable. Such noise is at places on the object wavefront acting as weak reference beams but so long as the real reference beam is stronger then the object beam then this noise will be suppressed. The optimum ratio of reference light to that of object light for a reflection hologram is that of a 70:30 split. That is, the reference beam comprises 70% of the pulsed lightwave and the time sequenced object beams comprise 30% of the pulsed lightwave.

Figure 11:
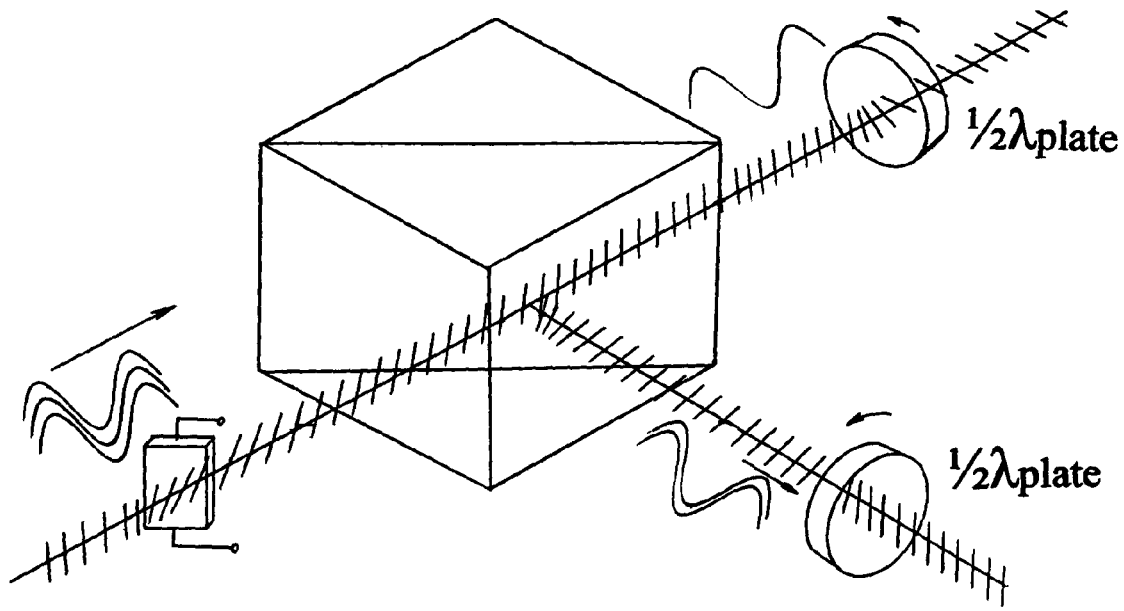
FIG. 11 shows a half wave plate and a polarizing beam splitter cube being used to adjust the ratio of the reflected and transmitted lightwaves.

It may be desirable to provide additional flexibility in obtaining enhanced recordings by utilizing a variable beam splitter instead of a beam splitter with a fixed ratio of transmitted to reflected beams. A variable beam splitter can be achieved by using a half wave plate to rotate the direction of the linearly polarized lightwave after the lightwave pulse exits the Laser. Such a Beam splitter is formed from the polarizing beam splitting cube with a half wave plate. The beam splitter ratio of the output reflected and transmitted lightwave pulses can be altered by rotating the incident lightwave using a half wave plate as shown in FIG. 11. One half-wave plate will be required on one output side of the beam splitter to realign the direction of polarization of either the reference and object lightwaves so that these waves are oscillating in the same direction.

As stated, the intensity of the reference beam should be approximately double the intensity of the object beam for the apparatus of this invention but this can depend on the brightness or dullness of the object.

For a dark grayish or brown object the ratio of intensities of reference lightwave to object lightwave of approximately 60:40 is required. For a very light object a ratio of intensities of 80:20 is required. A CCD is used to detect the brightness or dullness of the object with the CCD sending a signal to an input Pin of the microcontroller. The microcontroller then sends a corresponding number to a digital to analogue converter to rotate the polarization rotator at the input side of the beam splitter which adjusts the ratio of transmitted and reflected lightwaves appropriately. If a variable beam splitter is to be used instead of a fixed beam splitter then this will add substantially to the complexity of the apparatus because the circuit will also require a polarization rotator at the entry to the beam splitter that is also controlled by the micro-controller via a digital to analogue converter. In the timed sequence recording schedule to be described, the apparatus of this invention will NOT use a variable beam splitter to adjust the transmitted and reflected lightwaves. Instead, a beam splitter with the optimum split of 70:30 will be utilized and to reiterate, the reference beam will comprise 70% of the pulsed lightwave and the time sequenced object beams will comprise 30% of the pulsed lightwave.

Figure 12:
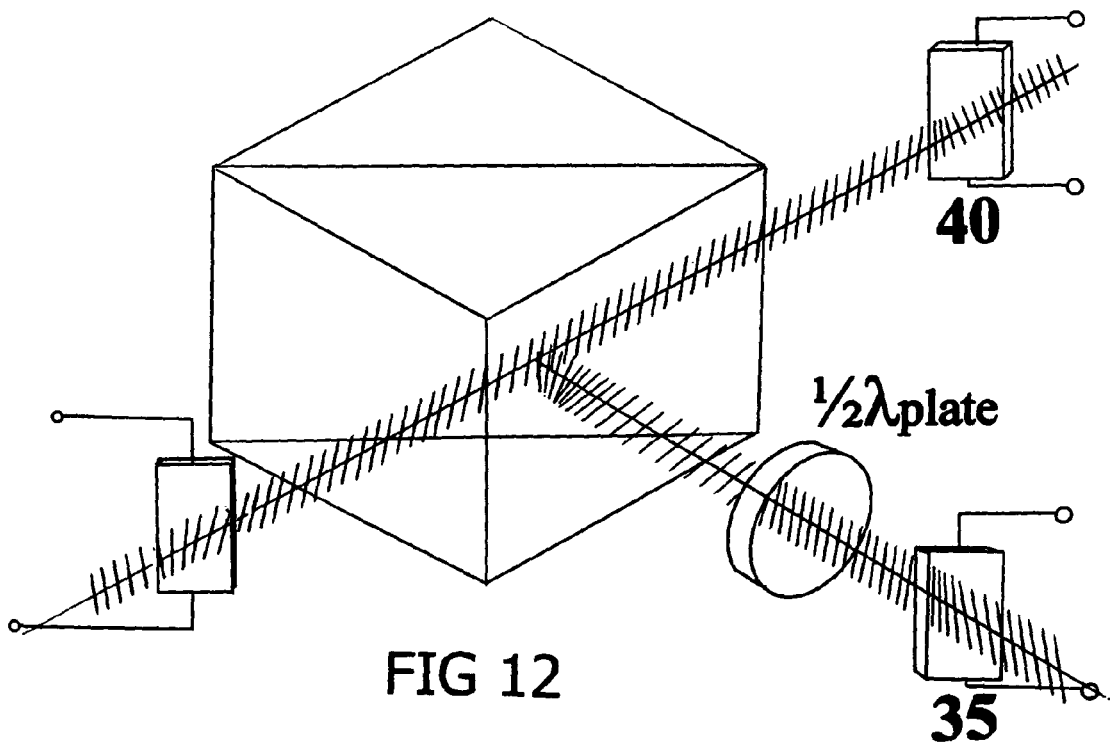
FIG. 12 shows the beam splitter/polarization-rotator arrangement used in the description of this apparatus

In either fixed beam splitter arrangement or variable beam splitter arrangement a half wave plate will be required between one of the output faces of the beam splitter and one of the polarization rotators either 35 or 40 such that both split lightwaves the s-polarized and p-polarized lightwaves will be aligned in the same plane of propagation. The half wave plate will retard the linear polarized lightwave by half a wavelength and thus is useful for rotating the polarization of the lightwave. If θ=the angle between the polarization direction of the lightwave and the fast axis of the waveplate then the angle by which the polarization of the lightwave will be rotated upon exiting the half wave plate will be 2θ. The beam splitter polarization rotator arrangement used in the apparatus of this description is shown in FIG. 12.

The Optical-Electronic Configuration

Figure 14:
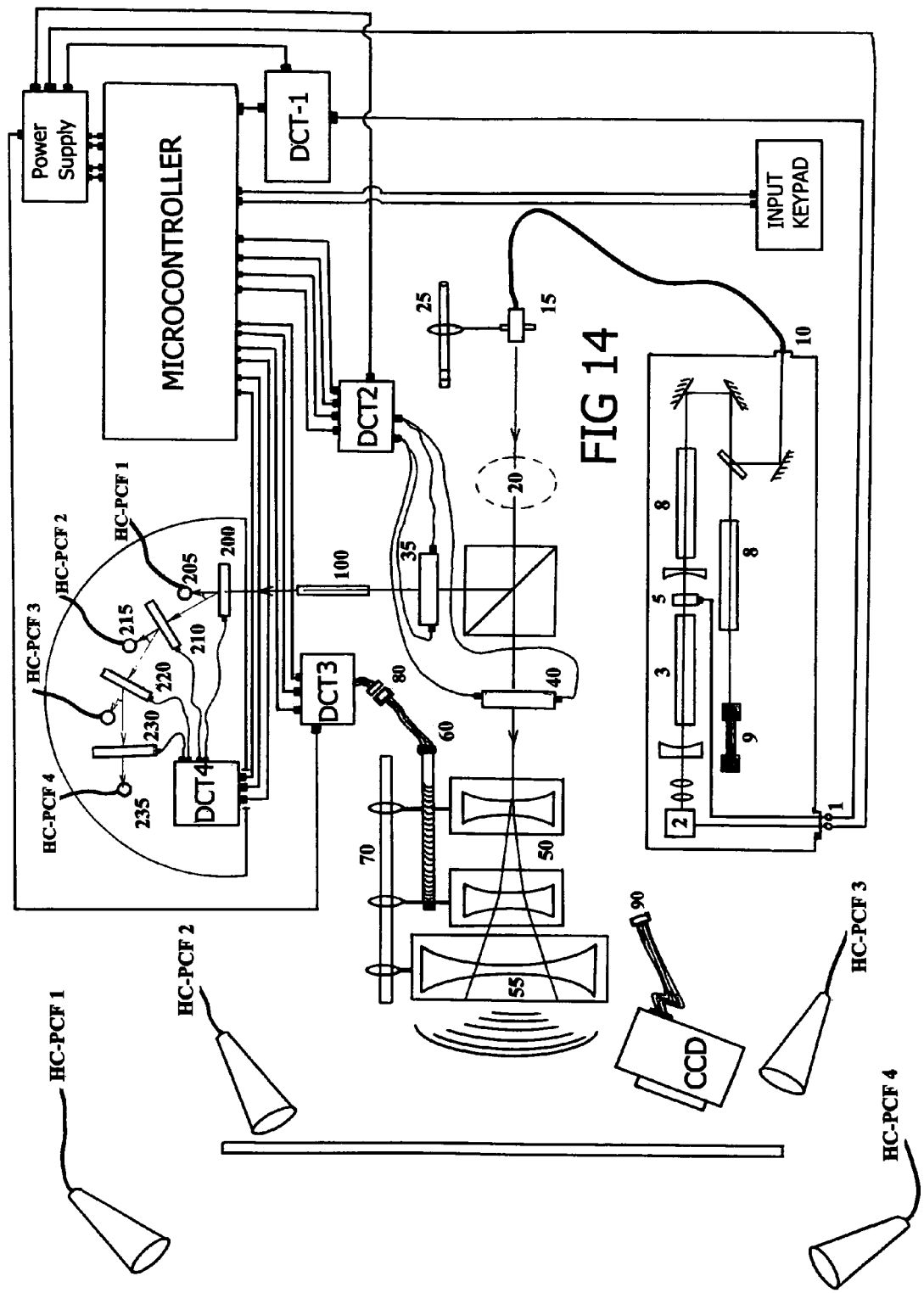
FIG. 14 is a detailed Schematic of the optical electronic configuration
Figure 15:
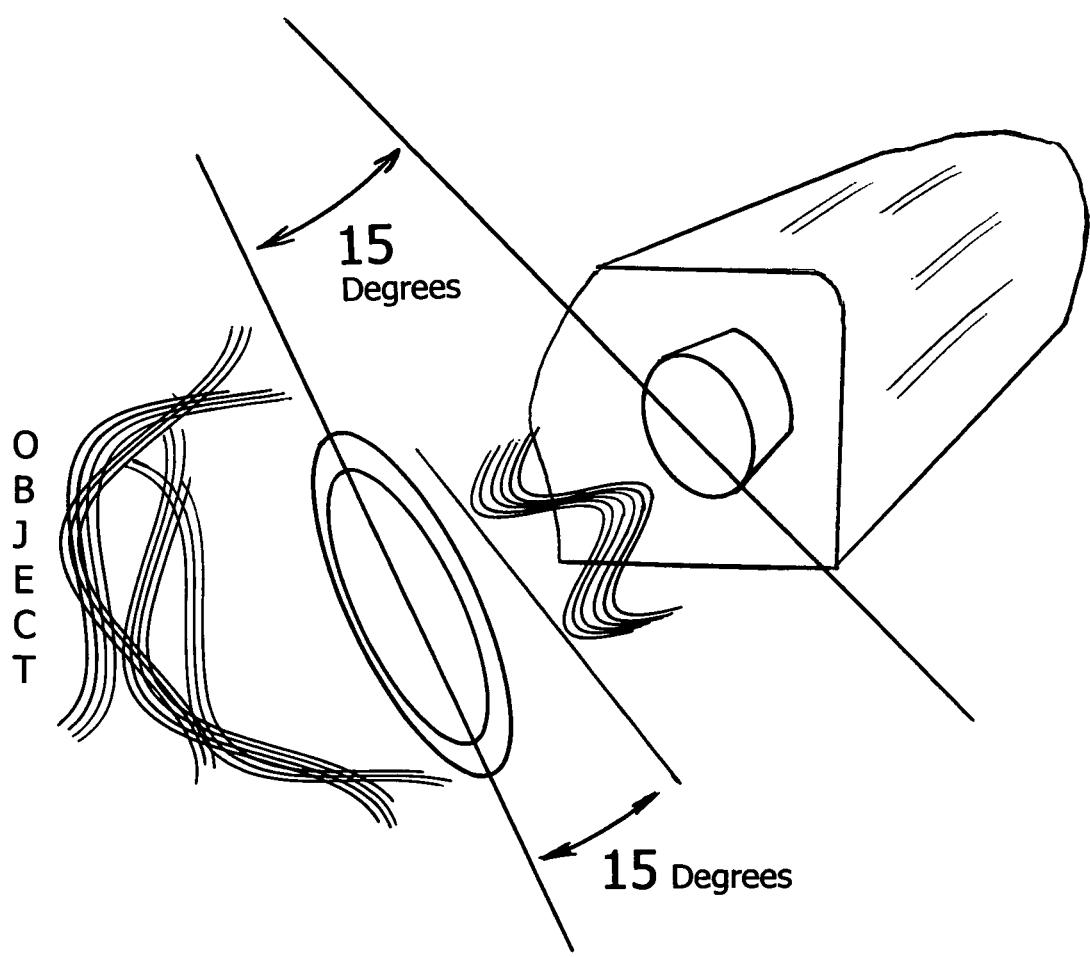
FIG. 15 shows the angle by which the circular film holder makes with the perpendicular plane of the reference wave which emanates out from the main compartment of the apparatus
Figure 16:
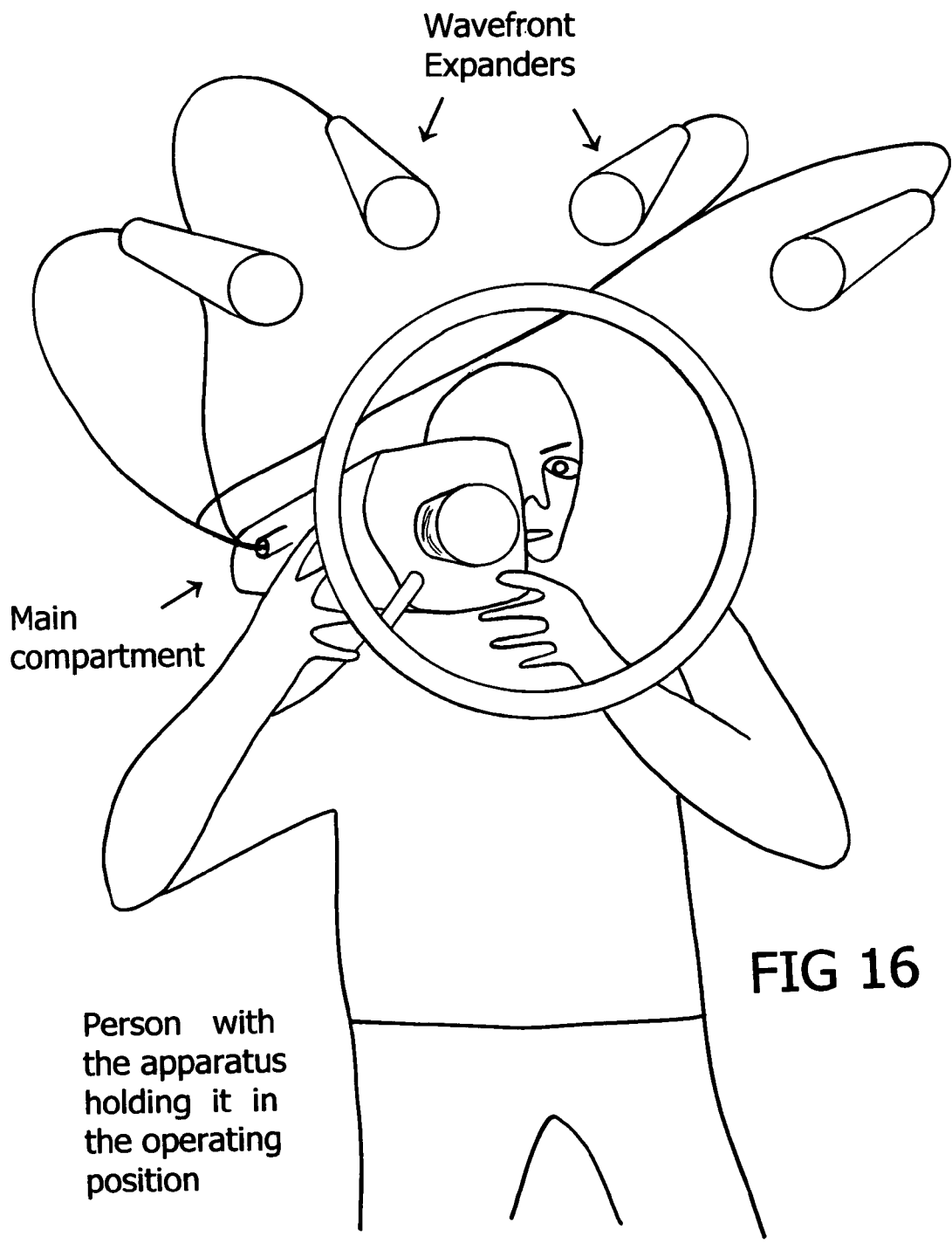
FIG. 16 shows the apparatus being held by a person for a recording

The configuration shown in FIG. 1 provides a simplified view of the basic optical circuit which is the core part of this invention. The more exact optical-electronic circuit layout is shown in FIG. 14 of which is now pertinent to the description from here onwards. As can be seen in FIG. 14 there is one main power supply and four minor voltage triggering circuits; Direct Current trigger 1 (DCT-1) through to DCT-4.

Figure 4B:
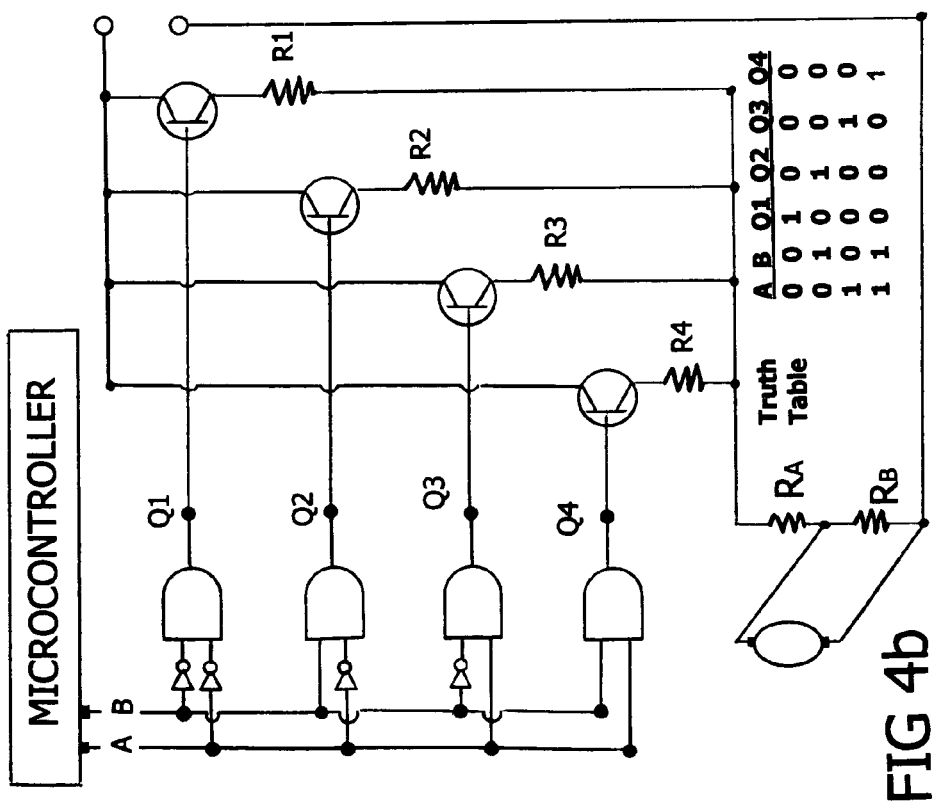
FIG. 4b is a suggested logic circuit to supply the same stepped voltages.

It is recommended that this main power supply will plug into a 240 volt/60 Hertz or 110 volt/50 Hertz mains and also be housed in a separate compartment outside the major body of the circuit. It is essential that the main body of the circuit be housed outside of this main compartment otherwise it will add unnecessary weight to the apparatus especially considering the way upon which this transportable apparatus will be used. The main power supply should be connected to the apparatus by a length of cabling comprising several lengths of insulated equipment wire. This main power supply will need one alternating current outlet for DCT-1 which could be tapped directly form the mains from the output of an isolation transformer. DCT-1 supplies the high voltage triggering pulse to the Q-switch of the laser and will require alternating current to enable voltage multiplication especially when using a diode-capacitor voltage multiplier configuration within a momentary high voltage discharge circuit. Suggested triggering circuits for DCT2 are shown in FIG. 4a and FIG. 4b.

DCT2 triggers the polarization rotators 35 and 40. A triggering circuit controlled from the microcontroller formed from either a digital to analogue converter as shown in FIG. 4a or formed from logic gates as shown in FIG. 4b would be ideal as a triggering circuit for DCT2 as these circuits can be expanded upon should more triggering states be required. Circuit DCT3 operates a motorized actuator which adjusts the beam expansion double concave lens pair 50. Triggering circuit DCT4 triggers each of the Switchable Bragg Gratings SBG200; SBG210; SBG220; SBG230 comprising the Switchable Beam Deflection Apparatus. A suggested triggering circuit formed from logic gates for DCT4 and controlled by the microcontroller to trigger the SBG's is shown in FIG. 4c

The pulsed laser system in FIG. 14 shows an infrared emitter 2; Nd;YLF resonator 3 and Q-switch 5; Glass Phosphate Rods 8; Brillion cell 9; and at 10 there is an exit-entry connection point with ultra-fine adjustment to guide the linearly polarized lightwave (laser pulse) into the HC-PCF waveguide. Shown in FIG. 14 the HC-PCF waveguide is connected from connection point 10 to a holding mount 15 from where the linearly polarized lightwave exits and passes through the polarizing beam splitter. As previously stated, the lightwave is split into two components oscillating orthogonal to one another; a p-polarized lightwave and an s-polarized lightwave. Each lightwave will be rotated by a polarization rotator in the timed sequenced recording.

As the reference lightwave exits the rotator it is expanded as it passes through a series of double concave lenses. As the object lightwave exits the rotator it enters the switchable beam deflection apparatus synchronized timed controlled by the microcontroller. Each pulsed lightwave must be switched through the apparatus in timed synchronization with the triggering of the Q-switch inside the laser resonator. The simple three state logic circuit formed from AND gates to trigger the Switchable Bragg Gratings is the circuit shown in FIG. 4c. The Switchable Beam Deflection Table is shown in FIG. 6.

Referring now to FIG. 7 and also to the logic circuit of FIG. 4c the switching scheme will now be described. This switching scheme will be referred to as the 'FORWARD SEQUENCE'; The first pulsed lightwave will pass directly through SBG 200 and into HC-PCF 1. The second pulsed lightwave will be deflected by SBG 200 and pass directly through SBG 210 into HC-PCF 2. The third pulsed lightwave will be deflected by SBG 200 and SBG 210 towards SBG 220 and pass directly through SBG 220 into HC-PCF 3. The fourth pulsed lightwave will then be deflected by SBG 200 and SBG 210 and also SBG 230 and thus moves towards SBG 230 and passes directly through SBG 230 into HC-PCF 4. There could of course be more HC-PCF waveguides and thus more wavefront expanders arrayed around the periphery in space.

In this case the scheme would continue in the FORWARD sequence. However, this switching scheme could in fact continue regardless with the pulsed lightwaves being switched in BACKWARD sequence and then again in FORWARD sequence. It should be recognized that in this description of the invention that the Switchable Bragg Grating SBG 230 is not actually needed. It will not deflect the path of another pulsed lightwave because there is not another HC-PCF waveguide in the sequence. However, it is left in the diagram for completeness.

The pulsed lightwave is then coupled into each HC-PCF waveguide by a plano-convex lens of 6.3 mm diameter and it is essential that ultra fine adjustment be incorporated into the HC-PCF holding mount thus enabling fine movement. It must be recognized when setting up the apparatus the difficulty in aligning the lightwaves into each of the HC-PCF waveguides will be extreme. Thus, the injection seeded laser must possess the built in option of operating in constant wave.

Lastly, each pulsed lightwave exits each HC-PCF waveguide into and through each Wavefront Expander. In this embodiment of the invention the operator will input via a keypad the approximate size of the recording window. The keypad consists of a separate microcontroller that adjusts the distances between the double concave lenses which comprise the Wavefront Expander in which motorized actuators enable this adjustment as shown in FIG. 8. For a smaller recording window the distance between the three double concave lenses will be reduced. For a larger recording window the distance between the three double concave lenses will be increased. A circuit that can provide the functionality to operate the motorized actuators is the circuit of FIG. 4*a*

The Microcontroller

The Microcontroller recommended for the main control circuit is Microchips 18FXX2 series peripheral Interface Controller (PIC) manufactured by MicroChip Technology Incorporated. Shown in FIG. 13*a* is the electronic circuit connection diagram and within the dashed lines is the connection diagram for the main circuit board. The PIC Microcontroller diagram shown is for MicroChips PIC 18F442 or PIC 18F452 Microcontrollers; these PIC's have 5 parallel ports and a clock frequency that can run from DC to 40 MHz. The PIC 18F442 has 16 kbytes of program memory and 768 bytes of RAM. The PIC 18F452 has 32 Kbytes of program memory and 1536 bytes of RAM. The power supply locations are at Pins labeled VDD and Vss. One of MicroChips smaller 16F series PIC's will be adequate for the microcontroller inside the keypad. In the terminology used by Microchip Technology Incorporated the accumulator is known as the 'WORKING REGISTER' however this register will be referred to herein as the accumulator so to be consistent with microprocessor terminology. Should Microchip's PIC 18FXX2 series microcontrollers be used to control the timed sequenced recording schedule to be used by this apparatus as is recommended then all relevant information is available from Microchip Incorporated however included in the figures is FIG. 13*c* which shows the memory map of Microchips PIC 18FXX2 series Microcontrollers and FIG. 13*d* shows a map of the Special Function Registers for these microcontrollers.

The structure of the memory in the PIC 18FXX2 series is made up of 16 Banks. A special register called the Bank Select Register BSR holds the bits which the programmer provides to select the bank where the program needs to switch into. These bits are shown on the left hand side of FIG. 13*c* and form the highest 4 bits of a 12 bit memory address. The four columns shown in FIG. 13*d* consisting of all the Special Function Registers form part of the highest Bank. The reset vector where the program starts is memory location 0000. The STACK in the PIC 18FXX2 series microcontrollers is a versatile memory block which can be used for saving a return memory address in a subroutine call or can be used by the programmer for short term data storage. The stack pointer holds the current stack address. It is set to zero on all resets and it's value is either incremented or decremented whenever the stack is automatically accessed. The Stack pointer is incremented when a value is pushed onto the stack and decremented whenever a value is popped off. The stack pointer is readable and writeable by the programmer and is configured as part of the Special Function Registers (SFR's) shown in FIG. 13*d* and is called STKPTR at memory location FFCH. As can be seen in FIG. 13*d* PORTS A through to PORTS E are located at memory locations F80h through to F84h of the Special Functions Registers.

The CCD

Figure 13B:
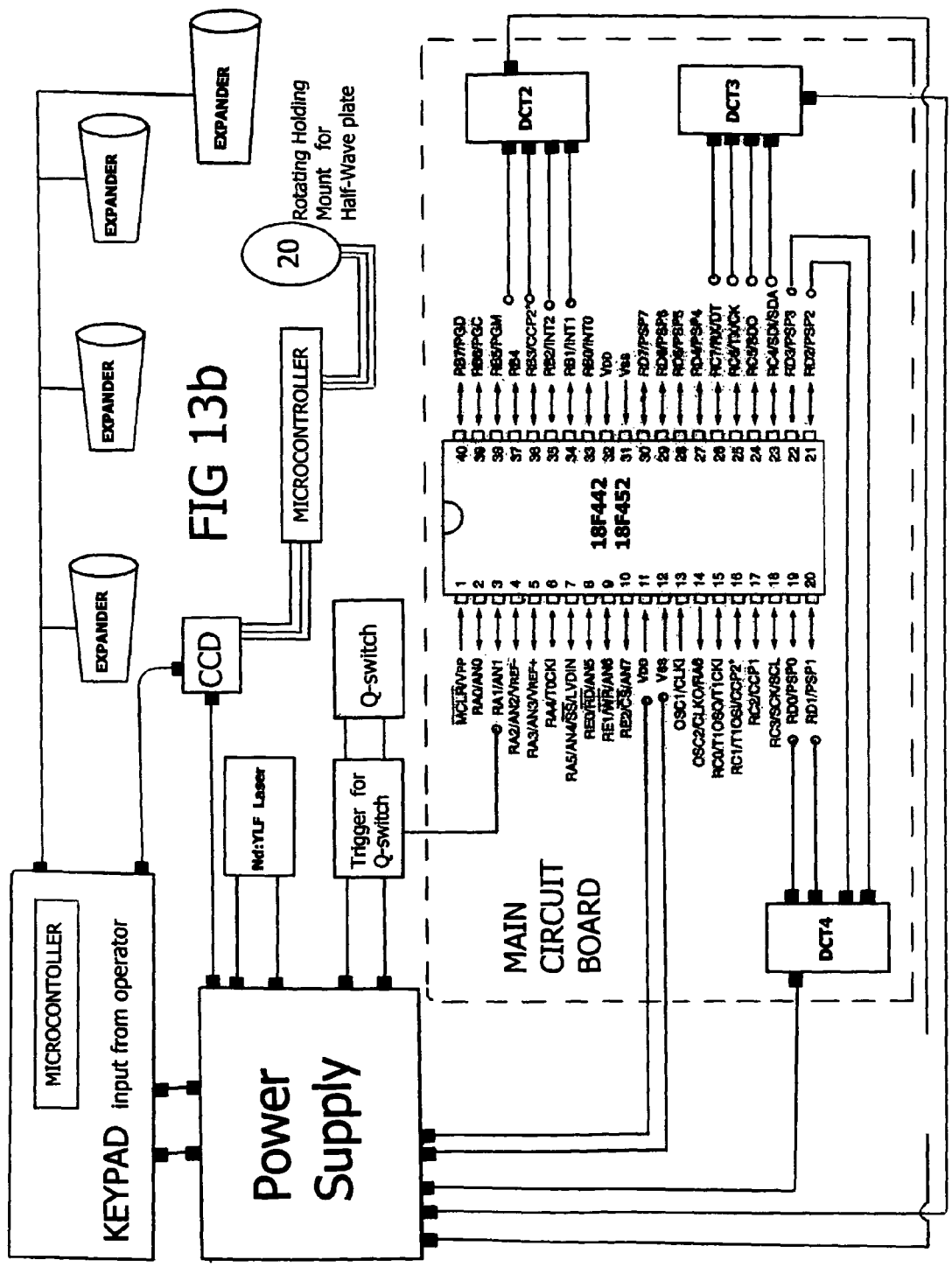
Figure 13C:
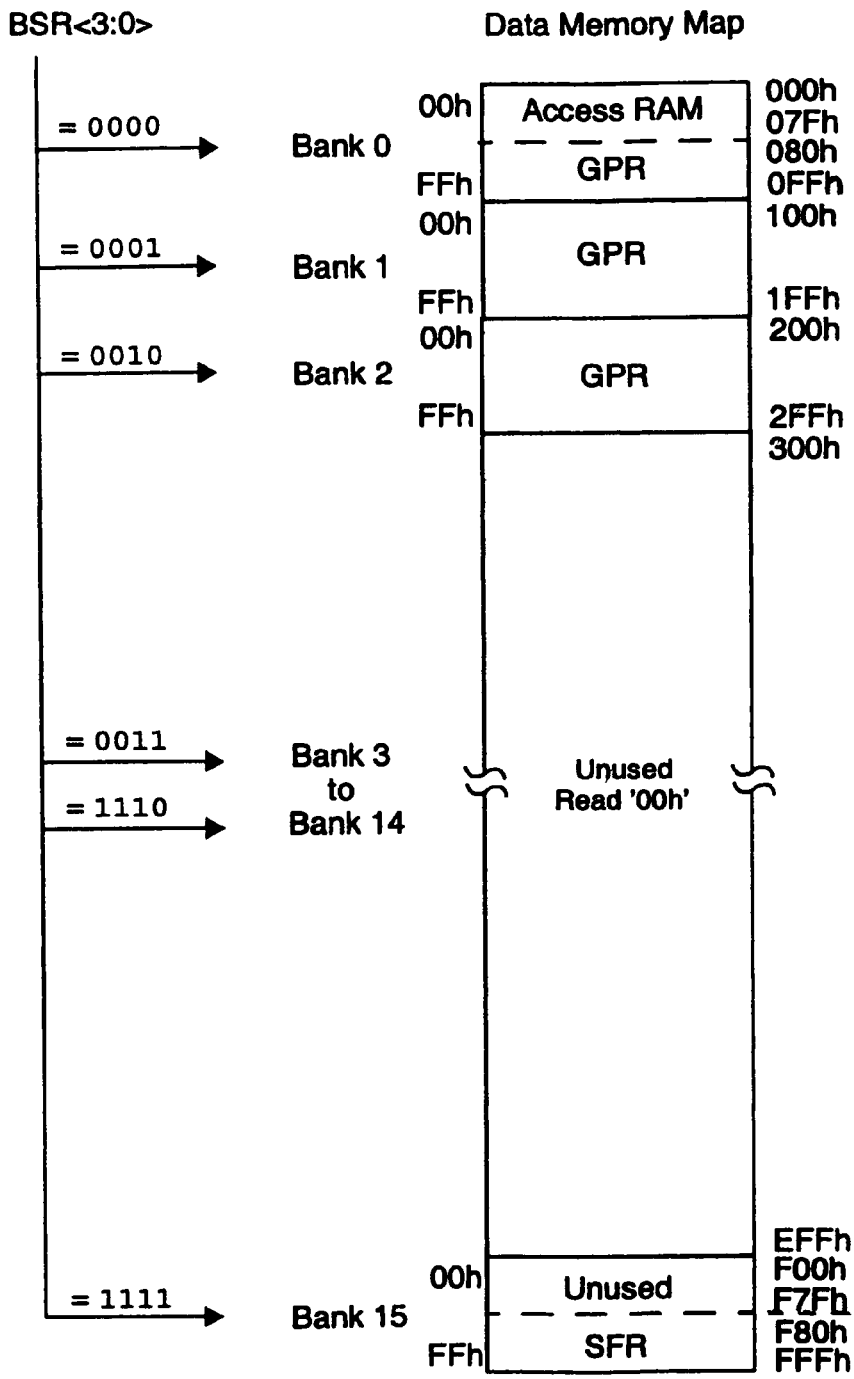
FIG. 13c shows the PIC 18FXX2 series memory map.

Shown in FIG. 13*b* is the electronic circuit connection diagram with the CCD added. should it be desired to equip the invention with the added feature of adjusting the beam splitting ratio in which a CCD will be needed to detect the brightness or dullness of the image to be recorded then this feature will require a separate microcontroller with this data being sent from the CCD to the input of the microcontroller. The microcontroller then outputs the corresponding data bits to rotate a holding mount for a half wave plate (20). However, adding this feature to enhance the recording process will add substantially to the complexity of the invention. This feature is only described here as an option but will NOT be part of the timed sequenced recording schedule to be described. In the recording schedule described the beam splitting ratio will be 70:30 as previously stated. Beam splitting cubes which split an incoming lightwave 70:30 are now common off the shelf components The Circular Film holder The circular film holder is a part of the apparatus which can be orientated so to provide an enhanced recording of the interference fringes. It is recommended that the reference beam is not directed completely perpendicular towards the film holder but instead the reference beam should cut into the recording medium at an angle of approximately between 20 to 30 degrees. This angle is easily achieved by designing the circular film holder such that the holding mount on the film holder can be twisted and fastened at such angle of between 20 to 30 degrees, where this angle is towards or away from the plane defined as being parallel to the front surface of the lens of which the reference beam exits. This holding mount that is part of the circular film holder will slide through the rail that is part of the main instrument compartment.

The Recording Medium

The recording medium required is an ultra-fine grain silver halide emulsion coated onto a cellulose tri-acetate substrate and which was described by Thiry and later improved by Iwasaki and Kubota which is previously cited and is well known by those skilled in the art of holography. The cyanine sensitizing dye recommended for recording at 532 nm is; 1,1',6-trimethylisocyannine iodine. After the emulsion is prepared and coated onto a substrate of cellulose tri-acetate the sheet is then cut into a circular disk. Once is a dark room the circular disc is inserted into the circular film holder and the recording schedule can begin.

The Timed Sequenced Recording

In now providing a recording schedule over a duration in time and around a periphery of a defined space it is anticipated that the main circuit board using the microcontroller is wired as shown in FIG. 13a. It is essential that by this stage of development of the apparatus the voltage needed to drive the two polarization rotators will have been ascertained, and thus triggering circuit DCT2 has been designed and connected to the microcontroller and both polarization rotators. It is also essential that the voltage needed to by the Switchable Bragg Gratings will have been ascertained and thus triggering circuit DCT4 has been designed and connected to the microcontroller and to all switchable Bragg gratings which comprise the Switchable beam deflection apparatus. It is also essential that by this stage of development the circuit DCT3 needed to control the motorized actuators 60 connected to the double concave lenses 50 is designed and connected to the microcontroller. It is also essential that by this stage of development a microcontroller has been wired inside the KEYPAD and that a program has been written by which the operator can input to this microcontroller the size of the recording window. The microcontroller will then output a corresponding digital value to an D to A converter which will cause correct adjustment of the double concave lens pair within each of the Wavefront Expanders with this adjustment being a simultaneous identical adjustment within each Expander This timed sequenced recording schedule will consist of four multiplexed exposures within a time interval of 1.1 seconds. In this time interval it is anticipated that an object moves in front of the recording window of the apparatus. The recording is carried out in the dark. For simplicity of operation it is recommended that the keypad microcontroller operates independently from the microcontroller that is the central component on the main circuit board. Otherwise the design becomes unnecessarily complex and harder to troubleshoot a problem in the programming.

When the apparatus is switched on the part of the power supply that supplies power to the keypad is switched on. The microcontroller within the keypad asks the operator to input the size of the recording window. As an example there could be four sizes. The largest recording window could be 600 mm in diameter and the smallest could be 100 mm in diameter. The sizes of the other two recording windows could be 400 mm and 200 mm in diameter. the microcontroller will then output the corresponding data bits to a Digital to Analogue converter with the voltage level activating the movement of the motorized actuators attached to the mounts of two of the three double concave lenses in each of the wavefront expanders. The distance moved by these two lenses will provide the correct expansion or contraction of the object beams. The microcontroller will then output the corresponding data bits to a Digital to Analogue converter within DCT3 with the voltage level activating the movement of the motorized actuators attached to the translating mounts of the double concave lenses (50) shown on FIG. 14. The distance moved by these two lenses will provide the correct expansion or contraction of the reference beam.

An input pin on the keypad microcontroller could be configured to receive an input high or low from a photo-resistor to indicate whether the environment is dark enough. If the environment is dark enough the microcontroller sends an output high within a continuous loop to a green LED indicating to the operator to proceed with the recording. The operator now has the option to proceed by pushing a momentary switch which slowly releases after two or three seconds. During this time interval the part of the power supply is turned on which turns on the laser and the microcontroller and the 1 to 2 second recording schedule begins.

The microcontroller within the main circuit board requires to be programmed to execute the timed sequenced recording schedule. The program for a suitable microcontroller would follow the format of this following program; Firstly all Pins on each of; Port A; Port B; Port C; Port D; Port E on the PIC 18F452 are set up as output Pins. Each of these ports has a corresponding Tri-State register. These pins can be configured as output pins by sending zero's from the accumulator (working register) to the corresponding Tri-State register.

The program is very straightforward as the program is only sending bits to the ports and calling a delay subroutine. For this multiplexed recording over a duration of approximately 1.5 seconds a delay subroutine of approximately 0.2 seconds will be chosen to be written into the program. The clock speed needs to be set and for simplicity a 1 KHz clock speed will be chosen. It must be ensured that the main program skips over the subroutine when the program arrives at it. The microcontroller firstly calls the delay subroutine 5 times as soon as the device and the laser are simultaneously switched on. The laser could need up to one second before it can be Q-switched.

The first recording begins with the program sending logic 1's into the accumulator. The program then shifts this value onto Port A on the microcontroller which is connected to the Q-switch triggering circuit. The Q-switch is then activated. For this first recording no activation of the polarization rotators or the Switchable Bragg Gratings is necessary. There should be a 0.2 second interval between each recording. Thus, the program then calls the delay subroutine.

The SECOND recording begins with the program sending the value 0000 0001 to the accumulator. To provide the first voltage level needed in the activation of the polarization rotators for this second recording the program shifts this value in the accumulator to Port B which is connected to triggering circuit DCT2. The program then sends the value 0000 100 to the accumulator. To activate the combinational triggering voltages to the Switchable Bragg Gratings this value in the accumulator is shifted to Port D which is connected to triggering circuit DCT4. The program then sends logic 1's into the accumulator. The program then shifts this value onto Port A on the microcontroller which is connected to the Q-switch triggering circuit. The Q-switch is then activated. A loop is created in which this section of the program is continually repeated for 0.1 seconds by decrementing down from a number between 0 to 255. The program then calls the 0.2 second delay subroutine. A duration of 0.5 seconds has now passed The THIRD recording begins with the program sending the value 0000 0010 to the accumulator. To provide the second voltage level needed in the activation of the polarization rotators for this third recording the program shifts this value in the accumulator to Port B which is connected to triggering circuit DCT2. The program then sends the value 0000 110 to the accumulator. To activate the combinational triggering voltages to the Switchable Bragg Gratings this value in the accumulator is shifted to Port D which is connected to triggering circuit DCT4. The program then sends logic 1's into the accumulator. The program then shifts this value onto Port A on the microcontroller which is connected to the Q-switch triggering circuit. The Q-switch is then activated. A loop is created in which this section of the program is continually repeated for 0.1 seconds by decrementing down from a number between 0 to 255. The program then calls the 0.2 second delay subroutine. A duration of 0.8 seconds has now passed The FOURTH recording begins with the program sending the value 0000 0011 to the accumulator. To provide the third voltage level needed in the activation of the polarization rotators for this fourth recording the program shifts this value in the accumulator to Port B which is connected to triggering circuit DCT2. The program then sends the value 0000 0111 to the accumulator. To activate the combinational triggering voltages to the Switchable Bragg Gratings this value in the accumulator is shifted to Port D which is connected to triggering circuit DCT4. The program then sends logic 1's into the accumulator. The program then shifts this value onto Port A on the microcontroller which is connected to the Q-switch triggering circuit. The Q-switch is then activated. A loop is created in which this section of the program is continually repeated for 0.1 seconds by decrementing down from a number between 0 to 255. The program then calls the 0.2 second delay subroutine. A duration of 1.1 seconds has now passed The timed sequenced recording schedule ends. The light sensitive recording medium is then removed and placed into an opaque wallet until it is ready to be placed into a development bath.

I claim:

1. An apparatus for the recording and timed sequenced multiplexing of interference fringes using monochromatic and coherent lightwaves comprising;
    a pulsed laser system;
    an optical circuit of which this optical circuit comprises of;
    two polarization rotators operated with timed-controlled pulsed voltage triggering and a half waveplate with a beam splitting cube and also a plurality of switchable bragg gratings coupled into a plurality of wavefront expanders connected to and extending from the main body of the apparatus by which said wavefront expanders arrayed along a line in space expand a plurality of object beam wavefronts along said arbitrary line to be reflected off an object and onto a light sensitive recording medium whereby enabling a timed sequenced recording of said interference fringes through said arbitrary line in space, wherein;
        (i) said half waveplate enables rotation of either s or p polarizations exiting said beam splitting cube to be rotated by 90 degrees and wherein;
        (ii) the said beam splitting cube enables beam splitting ratio of 30% to 70% and wherein;
        (iii) said pulsed voltage triggering of each said polarization rotator is timed controlled by a microcontroller in which said microcontroller has a parallel port that can output an 8-bit logic sequence in which this logic sequence is fed into a digital to analogue converter to control the output voltage across a field effect transistor and wherein;
        (iv) said switchable bragg gratings are coupled into said wavefront expanders by a microstructured optical waveguide in which this microstructured optical waveguide is a hollow core photonic crystal fiber and where said switchable bragg gratings are connected to a voltage triggering electronic circuit so to selectively deflect and channel a pulsed lightwave into either one of the plurality of optical waveguides, wherein the said voltage triggering is timed controlled by a microcontroller and
    of which the said interference fringes recorded onto a light sensitive recording material are known as reflection holograms and
    of which an apparatus assembled in this manner for timed sequenced recording of interference fringes will be defined as an Arrayed Coherent Wavefront Expansion Device with the acronym ACWED.

2. Apparatus of claim 1 in which a rotating half wave plate is incorporated into the polarization rotator/beam splitter arrangement in which rotation of this half wave plate placed at the input of the beam splitting cube can adjust the intensity ratios of the reference beam and object beam wavefronts.

3. Apparatus of claim 1 in which the Q-Switch of the pulsed laser system is timed controlled triggered by said microcontroller.

4. Apparatus of claim 1 in which a light sensitive film holder is attached to the main body of the apparatus and along a plane that is near perpendicular to the direction of propagation of said reference beam wavefront in which this space in close proximity to the film holder is known as the recording window of the apparatus.

* * * * *